(12) United States Patent
Nichols et al.

(10) Patent No.: US 11,772,796 B2
(45) Date of Patent: Oct. 3, 2023

(54) SYSTEM AND METHOD FOR MOUNTING ITEMS TO AN AIRCRAFT FLOOR

(71) Applicant: Moose Manufacturing LLC, Chesterfield, MI (US)

(72) Inventors: Angelo H. Nichols, New Baltimore, MI (US); Harry A. Nichols, New Baltimore, MI (US)

(73) Assignee: Moose Manufacturing LLC, Chesterfield, MI (US)

( * ) Notice: Subject to any disclaimer, the term of this patent is extended or adjusted under 35 U.S.C. 154(b) by 523 days.

(21) Appl. No.: 17/048,631

(22) PCT Filed: Apr. 23, 2019

(86) PCT No.: PCT/US2019/028600
§ 371 (c)(1),
(2) Date: Oct. 19, 2020

(87) PCT Pub. No.: WO2019/209755
PCT Pub. Date: Oct. 31, 2019

(65) Prior Publication Data
US 2021/0237878 A1 Aug. 5, 2021

Related U.S. Application Data

(60) Provisional application No. 62/661,567, filed on Apr. 23, 2018.

(51) Int. Cl.
*B64D 9/00* (2006.01)
*B64C 1/06* (2006.01)
*B64C 1/20* (2006.01)

(52) U.S. Cl.
CPC .............. *B64D 9/003* (2013.01); *B64C 1/064* (2013.01); *B64C 1/20* (2013.01)

(58) Field of Classification Search
CPC .. B64C 1/18; B64C 1/20; B64D 9/003; B64D 11/0648
(Continued)

(56) References Cited

U.S. PATENT DOCUMENTS 3,902,583 A * 9/1975 Laibson .................... B64C 1/20
193/35 MD
6,068,214 A * 5/2000 Kook ........................ B64D 9/00
244/118.6
(Continued)

FOREIGN PATENT DOCUMENTS

CA 3052734 A1 * 2/2020 ............... A47C 3/18
CN 109606619 A * 4/2019
(Continued)

*Primary Examiner* — Christopher P Ellis
(74) *Attorney, Agent, or Firm* — Jeffrey E. Semprebon; Semprebon Patent Services

(57) ABSTRACT

An item to be secured to an aircraft floor can be secured to a Load Transfer Structure that resides under the floor, via access passages provided in selected floor panels. The Load Transfer Structure transfers the weight of the item to members of the airframe, and is designed to accommodate loads during normal flight without restricting the designed movement of the airframe; however, under abnormal conditions such as a crash, the Load Transfer Structure engages members of the airframe to transfer loads thereto to secure the item.

21 Claims, 15 Drawing Sheets

(58) Field of Classification Search
USPC .................................................. 244/118.1
See application file for complete search history.

(56) References Cited

U.S. PATENT DOCUMENTS

| | | | |
|---|---|---|---|
| 6,378,939 | B1 | 4/2002 | Knoll et al. |
| 6,572,304 | B1 * | 6/2003 | Hessling ............ B64D 11/0696 |
| | | | 403/321 |
| 6,923,606 | B2 | 8/2005 | Fehrle et al. |
| 7,445,181 | B2 | 11/2008 | Knoll et al. |
| 8,366,041 | B2 | 2/2013 | Ricaud et al. |
| 9,139,282 | B2 | 9/2015 | Benthien |
| 9,623,914 | B2 | 4/2017 | Grosse-Plankermann et al. |
| 9,815,544 | B2 | 11/2017 | Liu et al. |
| 9,896,185 | B2 | 2/2018 | Cullen et al. |
| 10,731,790 | B1 * | 8/2020 | Williams ............ F16M 13/022 |
| 11,440,664 | B2 * | 9/2022 | Galliot ..................... B64C 1/18 |
| 2005/0224648 | A1 * | 10/2005 | Grether .................... B64C 1/20 |
| | | | 244/118.5 |
| 2010/0116933 | A1 * | 5/2010 | Erickson ............ B64D 11/0696 |
| | | | 248/503.1 |
| 2015/0108273 | A1 * | 4/2015 | Oleson ..................... B64C 1/18 |
| | | | 244/120 |
| 2015/0344124 | A1 * | 12/2015 | Liu ........................... B64C 1/18 |
| | | | 244/131 |
| 2017/0247101 | A1 | 8/2017 | Guering |
| 2019/0329892 | A1 * | 10/2019 | Roth .................. B64D 11/0696 |

FOREIGN PATENT DOCUMENTS

| | | | | |
|---|---|---|---|---|
| DE | 102010046932 A1 * | 1/2012 | ............... | B64C 1/20 |
| DE | 102012005353 A1 * | 9/2013 | ............... | B64C 1/18 |
| DE | 102015222233 A1 * | 5/2017 | ............... | B64C 1/20 |
| EP | 3527486 A2 * | 8/2019 | ............... | B64C 1/18 |
| JP | 2012-23335 A | 2/2012 | | |
| WO | WO-2015061303 A1 * | 4/2015 | ............... | B64C 1/18 |
| WO | 2016/190258 A1 | 12/2016 | | |
| WO | 2017/187940 A1 | 11/2017 | | |
| WO | 2019/004150 A1 | 1/2019 | | |
| WO | WO-2019115233 A1 * | 6/2019 | | |
| WO | WO-2020107008 A1 * | 5/2020 | ............... | B64C 1/06 |

* cited by examiner

SYSTEM AND METHOD FOR MOUNTING ITEMS TO AN AIRCRAFT FLOOR

TECHNICAL FIELD

The present disclosure relates to a system and method for mounting items such as seats, ammunition containers, gun mounts, electronic equipment, internal fuel tanks, and other equipment or cargo, securely onto a particular area of an aircraft floor.

BACKGROUND ART

There are instances when one or more items must be mounted securely in an aircraft at a particular location. For example, a seat might have to be mounted in a specified location in order to observe out a window, or a weapons system must be manned, or some equipment must be placed in a specific location to monitor or collect data; whatever the reason, the problem is that there are frequently no existing mounting interfaces available to secure the item at the desired location. Additionally, attaching an item to the floor by directly fastening it to a floor panel would not be permitted by flight safety regulations. Any modifications to the floor would require testing, approval, engineering assessments. Furthermore, the floor panels are very weak structurally in some directions and would, on their own, often be incapable of restraining the mounted item under forces imparted by aircraft motion; this is particularly true for military aircraft, which may need to take sudden evasive actions which generate greater forces than occur during normal flight, and true of any aircraft when securing items in the event of a crash.

To work around these problems, many solutions have been developed and patented. One common approach has been to install a pallet that rests atop the floor, to which the equipment is then mounted, such as taught in U.S. Pat. No. 6,923,606. The pallet is secured to existing aircraft floor mounting interfaces, typically rings that are attached under the floor to the aircraft formers which are designed to handle large loads. The pallet distributes the loads generated by the mounted equipment over a large area. The pallets have many drawbacks, such as increased tripping hazard for aircrew due to the raised floor area, obstruction of existing mounting points on the aircraft deck (which prevents other necessary equipment from being securely mounted to the aircraft deck), and undesirable added weight (which limits the useful capacity of the aircraft).

SUMMARY OF INVENTION

The present invention includes a method for mounting items to an aircraft floor that avoids the drawbacks of the prior art, as well as systems for implementing the method.

It must be noted that the new method typically requires modification to the existing floor panels (or replacement with modified panels), which is VERY limiting for general use on aircraft. As noted in the Background, any modification to existing aircraft structure requires engineering approvals, testing, and an array of certifications before this new method can be implemented. Despite these issues, there are conditions where the gain in utility will far outweigh the cost and effort of review and approval of the modification, which will allow the user to benefit from our new mounting method.

The present mounting method has very distinct steps which allow for mounted equipment (hereafter, "equipment" and "item" are used interchangeably, even though some items that might be mounted, such as cargo, are typically distinguished from "equipment" in common usage) in specific areas of an aircraft floor to be robust enough to pass aircraft crash requirements, while at the same time not stiffening or altering the load characteristics of the aircraft during normal operation.

The basic steps of the method are:
1) Determine the desired location of the item(s) to be mounted.
2) Mark the general area on the panel or panels directly below the mounting area.
3) Remove the panel(s) and modify the panel(s) by providing access passages into them in the marked area (either by opening passages through existing floor panels or replacing the existing panels with new panels provided with the necessary passages).
4) Design a custom Load Transfer Structure (LTS) for the aircraft location and install one or more LTSs under the floor.
5) Replace the modified floor panel(s)
6) Mount the item(s) to the LTS through the floor panel(s), either directly or indirectly (by using bracket interfaces).

The LTS is configured with respect to the specific location and aircraft structure to limit motion with respect thereto, to secure the item in place during normal flight operations, and to transfer loads to the aircraft structure during high-G events such as a crash, while not impeding any necessary flexing of the aircraft frame during normal flight operations. Accordingly, the LTS should meet several design objectives:
  Provide structure to mount at least one item located above the floor to the LTS;
  Be configured relative to the aircraft structure to limit the displacement of the LTS in the X, Y, and Z directions;
  Serve to transfer loads from the LTS to existing or added aircraft structures; and
  Be configured relative to the aircraft structure to prevent the LTS from interfering from normal structural load transfers while the aircraft is operating within its design parameters.

From the above method, it should be understood by one skilled in the art that the system to implement the method typically has one or more modified floor panels, an LTS configured for the specific location in the aircraft, and structure to allow securing the item to the LTS, while the item remains above the floor, and at least the majority of the LTS resides below the floor.

Depending on the situation, more than one LTS may be employed, or a single LTS having multiple segments that are attached together could be employed. Whether a system employing more than one rigid structure is considered to employ multiple LTSs or a single segmented LTS is considered an arbitrary definition, and one skilled in the art will appreciate that the term LTS is intended to cover any structure or combination of structures that serve the above design objectives.

BRIEF DESCRIPTION OF DRAWINGS

FIG. 5 is a side view of a short LTS 250 which only spans two adjacent formers 102, while

As shown in FIG. 9, resilient material 208 is interposed between the clamping elements and the former lip, and a gap just above the resilient material allows space for normal flexure of the former 102.

FIG. 12 shows what an exemplary final assembly would look like. The outriggers 203A have been extended and the two LTS units have been linked together. In addition, material 318 can be added to the existing under floor structure to further limit LTS displacement. In FIG. 12, material 318 has been added to the airframe to limit the displacement of the LTS in the Y direction. This material can be fastened using fasteners or adhesives.

FIG. 15 shows bolts 108 mounting into the LTS though the access passages 104 in the floor panel 103. These bolts 108 are one method that can be used to secure an item above the floor 103 to the LTS 200 below. If the LTS is not being utilized, the access passages can be covered with cap 215 to seal the floor panel 103.

DESCRIPTION OF EMBODIMENTS

The mounting system of the present invention addresses the need when an item or items must be mounted in a particular area of an aircraft in which the floor panels in that area are not capable of supporting routine or crash loads, and/or when existing mounting interfaces present on an aircraft floor are not in the desired area or are otherwise unavailable. Since items and equipment to be secured are referred to throughout the present discussion, for brevity such items and equipment are simply referred to as "item(s)".

Figure 1:
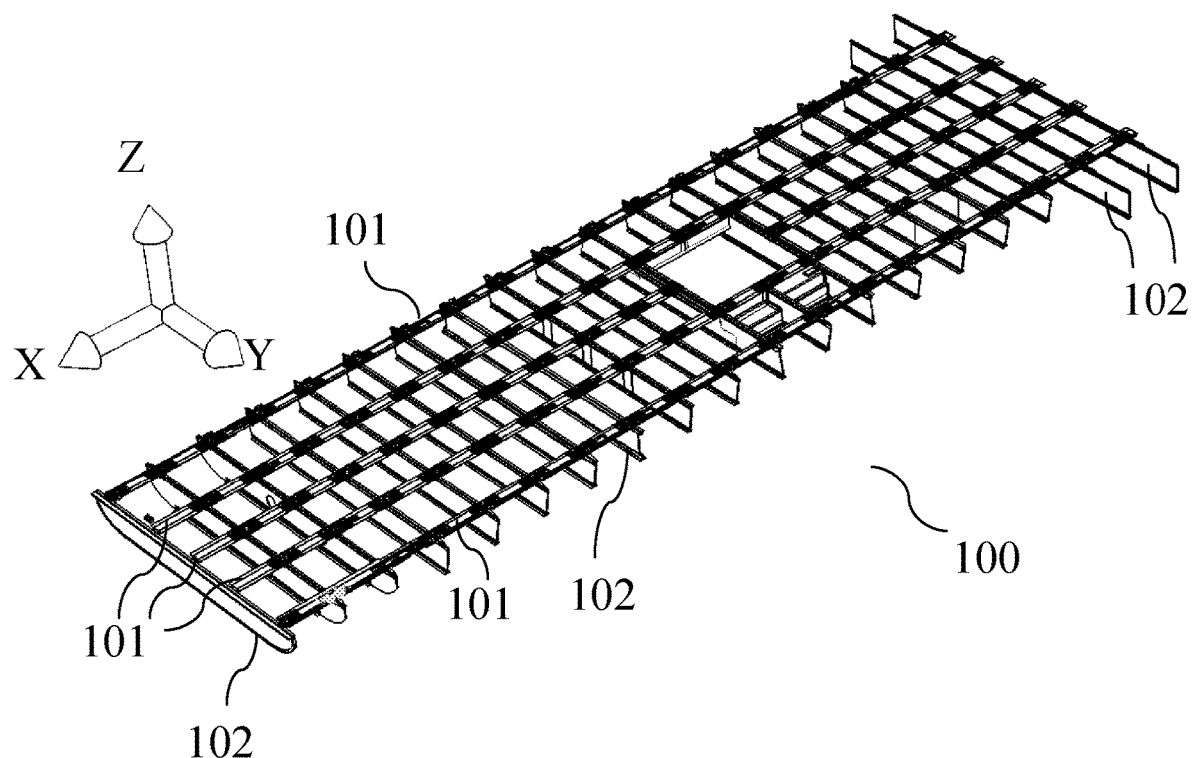
FIG. 1 illustrates a typical aircraft and main deck 100 with the floor panels removed, showing the 3-dimension orientation referred to throughout the present description of the invention. Also shown are a series of stringers (tie down adapters) 101 that run in the X direction and an array of formers 102 spanning the Y direction.
Figure 2:
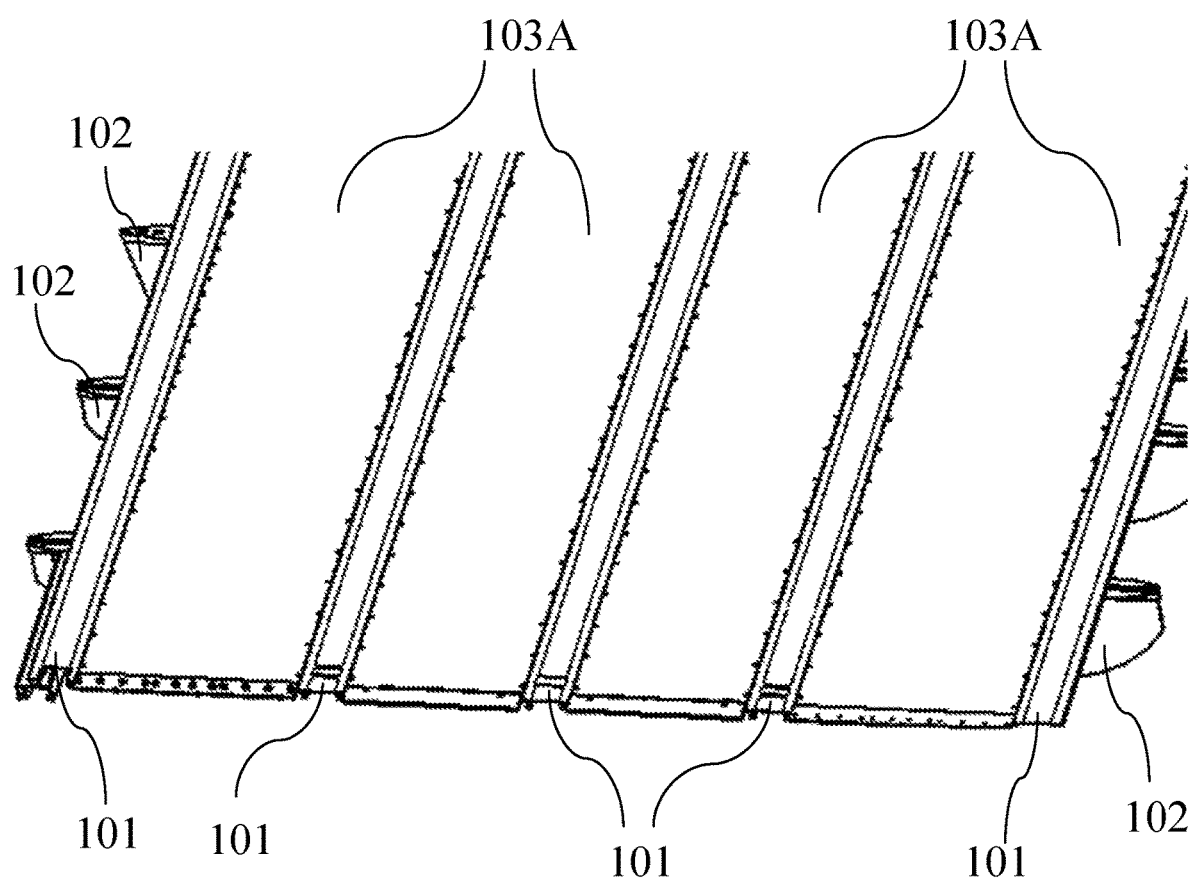
FIG. 2 illustrates a typical aircraft deck. Four floor panels 103A are shown along with five stringers 101. The stringers and panels are sitting on top of aircraft formers 102.

FIG. 1 illustrates one example of a partial airframe 100 for which the present invention is suitable; as illustrated, the airframe 100 is typical of a CH-47 aircraft, but the invention can provide benefits for other aircraft types as well. The airframe defines three perpendicular axes of direction. An X axis extends the length of the airframe 100, parallel to longitudinal stringers 101, a Y axis, perpendicular to the X axis, extends across the width of the airframe 100 parallel to transverse formers 102, and a Z axis extends along the height of the airframe 100 perpendicular to the X-Y plane. The airframe 100 is made up from a series of the transverse formers 102, connected together by the longitudinal stringers 101, which provide a conventional mounting structure onto which floor panels 103A are mounted as depicted in FIG. 2. A series of the floor panels 103A reside atop the formers 102 and between the stringers 101, providing a surface for support of personnel, items, and cargo.

Figure 3:
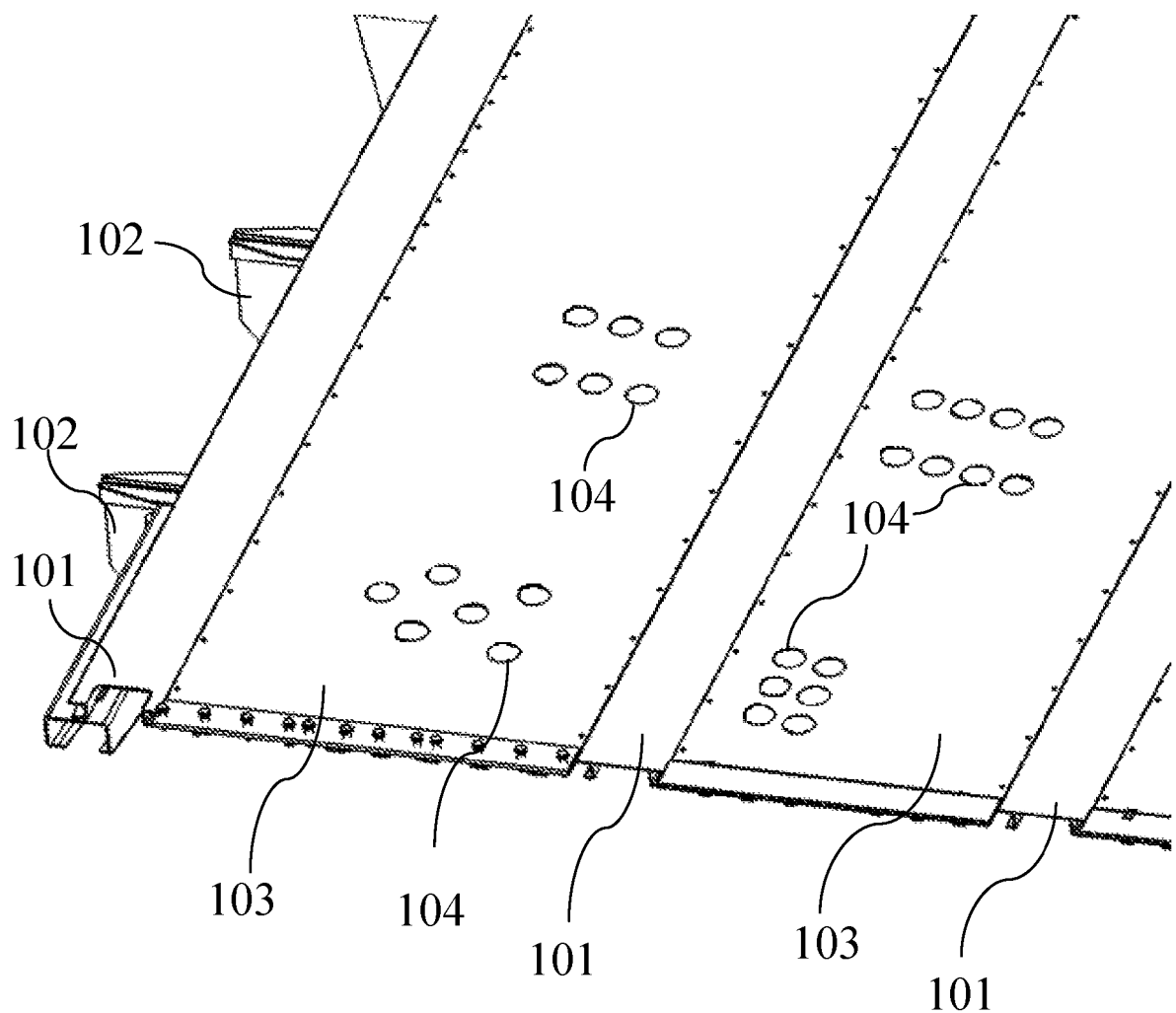
FIG. 3 illustrates the same deck from FIG. 2 but the floor panels have been modified by the addition of cutouts 104 or access passages. These access passages happen to be holes (circular cutouts).
Figure 4:
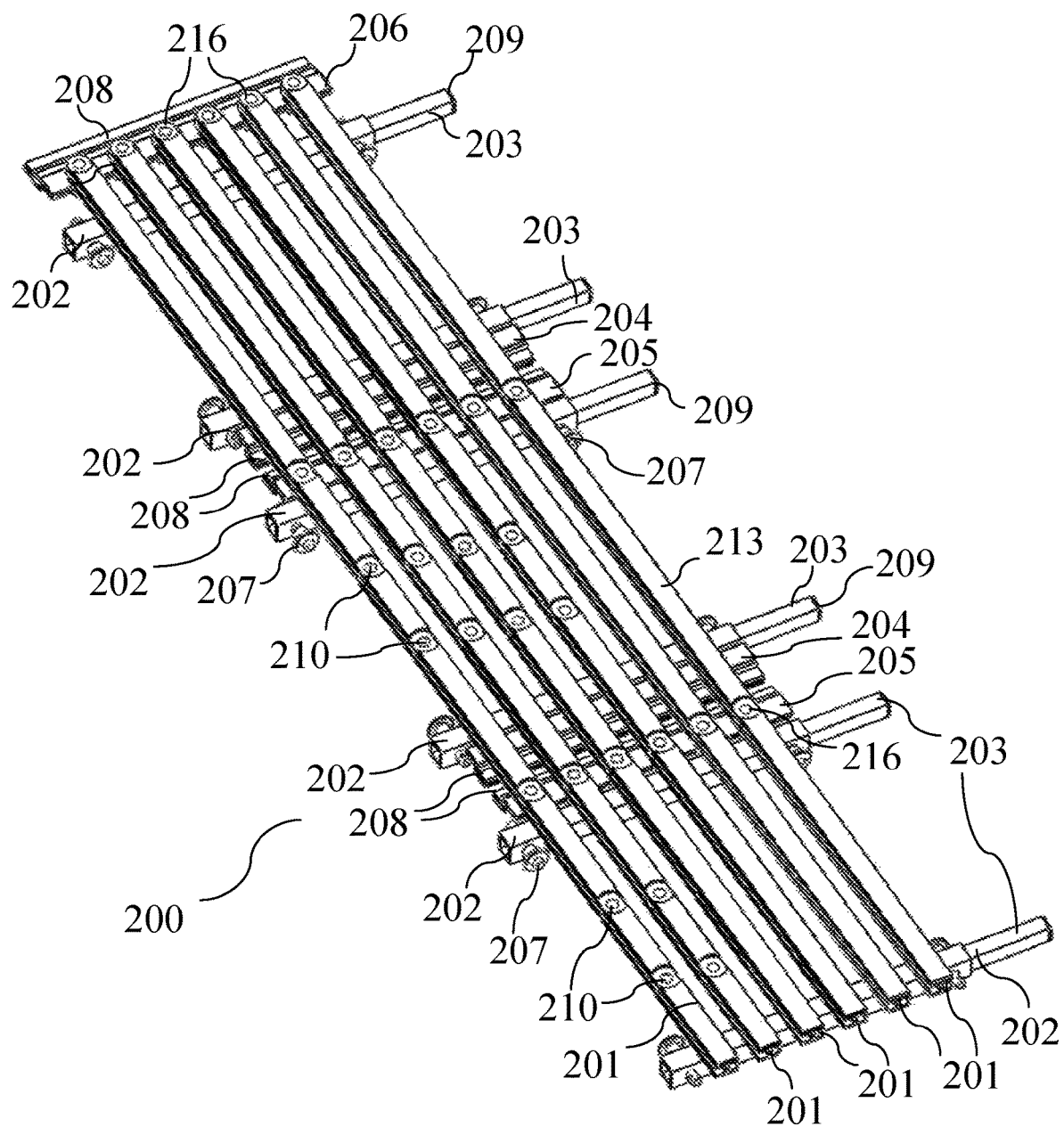
FIG. 4 illustrates one example of a Load Transfer Structure (LTS) 200 suitable for use transferring forces from an item secured thereto to the aircraft structure. The LTS 200 shown in FIG. 4 employs mounting members 201 that are relatively long, traversing a number of formers 102 of the airframe. The mounting members are connected together by cross members 202 to form a rigid structure.
Figure 7:
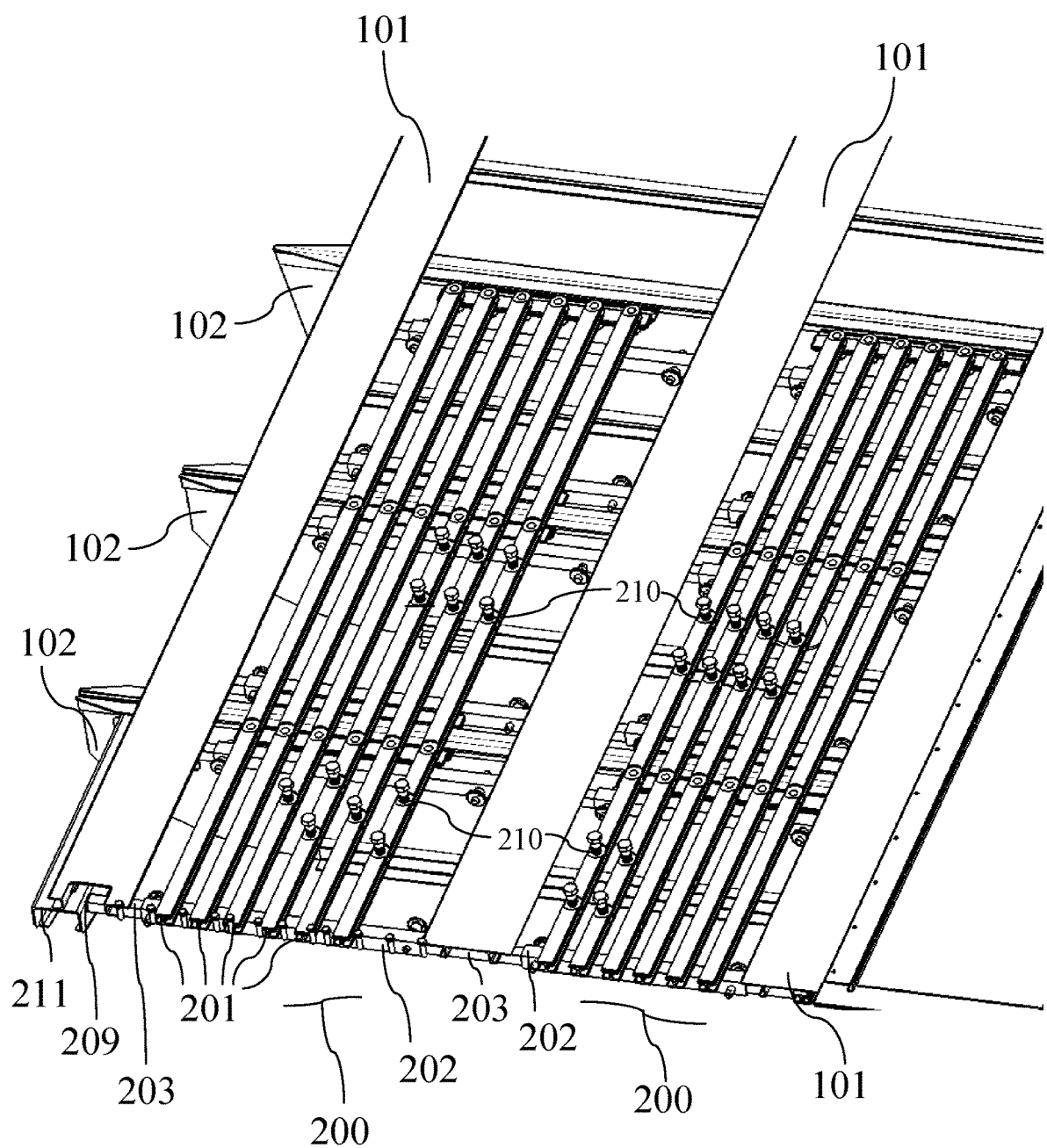
FIG. 7 illustrates an exemplary embodiment of the present invention, where a set of floor panels (103 as shown in FIG. 3) have been removed and two LTS units 200 (such as shown in FIG. 4) have been installed.
Figure 19:
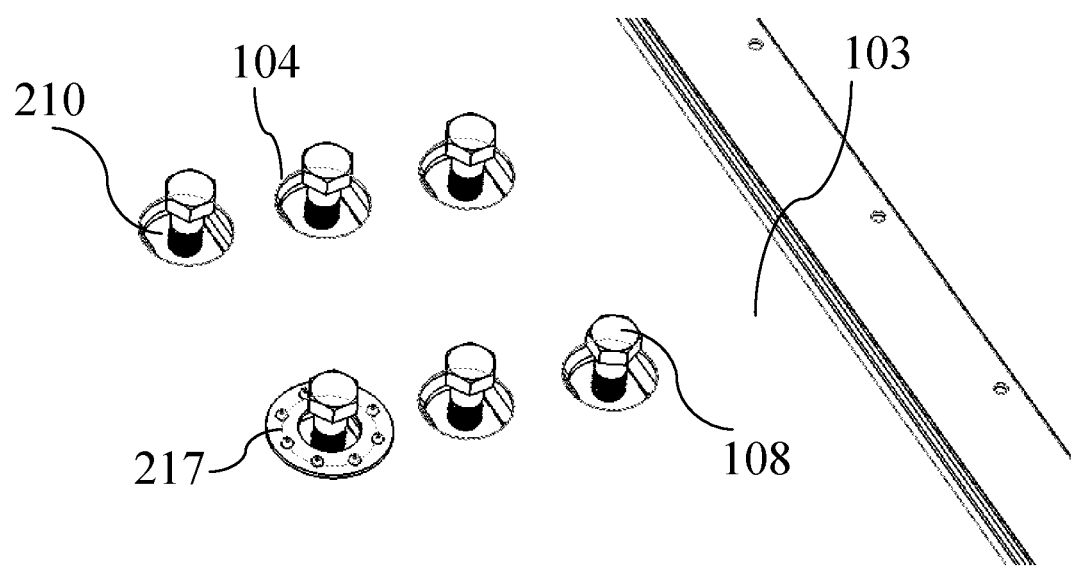
FIG. 19 illustrates the use of a doubler plate to maintain the floor panel strength after cutting out the access passages in the panel.

To accomplish the task of mounting an item atop a particular location on the aircraft floor, the method of the present invention uses one or more Load Transfer Structures (LTS) 200, such as shown in FIG. 4, which are structures designed to transfer loads generated by an item secured thereto to structures under the floor, such as the formers 102 (as better shown in FIG. 7). To interface with the LTS 200 located under the floor panel(s) 103, access passages in the form of material cutouts 104 must be made to the floor panel(s) 103A to form modified floor panels 103, as depicted in FIG. 3. Access passages 104 can have any shape, but round holes are preferable. For increased strength, doubler plates 217 (such as shown in FIG. 19) around the access passages 104 can be added to reinforce the modified panel(s) 103. The modification of the floor panels 103A to provide the panels 103 with access passages 104 can be done by machining the existing panels 103A to provide the access passages 104, or by replacing them with panels 103 that have the desired access passages 104 already formed therein.

Figure 11:
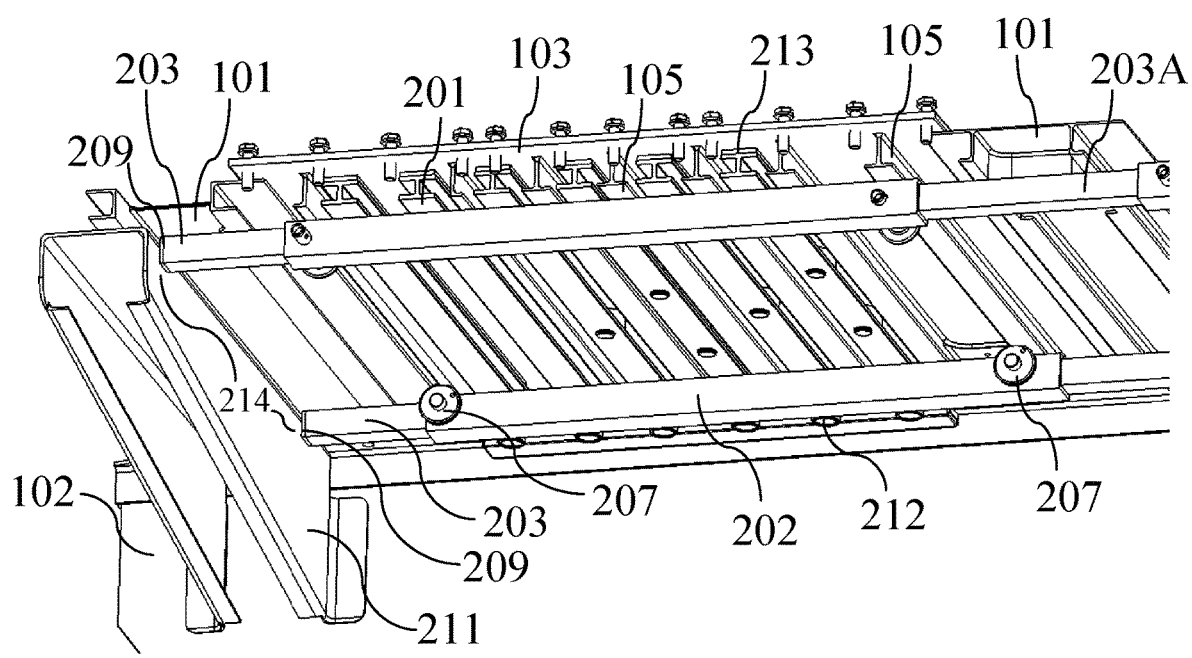
FIG. 11 is a view of a portion of the airframe 102 with a structural member 211, floor 103 and stringers 101, and installed LTSs 200 shown in FIG. 7, looking up from the bottom of the aircraft at an oblique angle. LTS outrigger members 203 and 203A have been extended and pinned 207 into place to limit displacement of the LTSs. The outrigger 203 with its cap 209 on the left limits displacement against existing aircraft structure 211. The outrigger on the right 203A is coupled to the neighboring LTS, providing a connection underneath one of the stringers.

It is generally preferred that the access passages 104 through the floor panel 103 be placed in an area of the floor panel 103 which avoids any reinforcement structures such as ribs 105 (such as shown in FIG. 11) on the underside of the panel 103A from being removed or modified.

Figure 10:
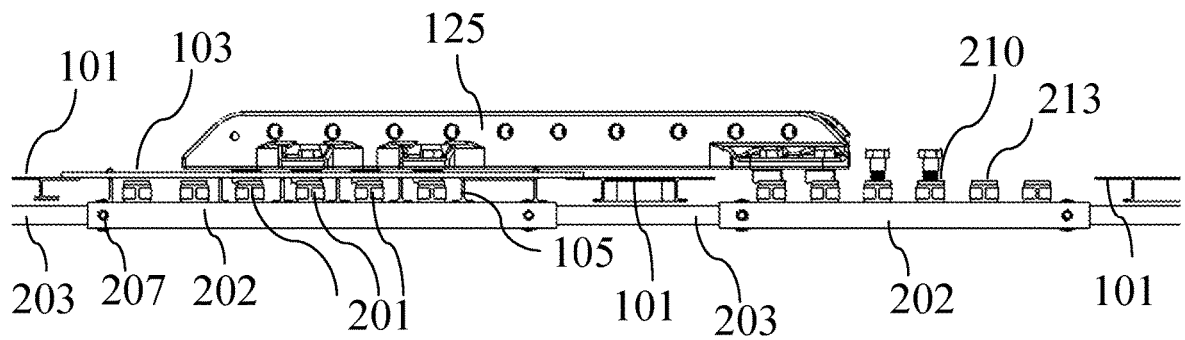
FIG. 10 is a front view of the airframe, floor, and two installed LTS units shown in FIG. 8.

Typically, the access passages 104 are located between any structural reinforcing ribs 105 (such as shown in FIGS. 10 & 11), commonly located on the underside of the panel 103. It is recommended that, once the desired area for mounting an item is determined, the area should be marked on top of the floor panel 103A, so that when the panel 103A is removed, an inspection of the structures 105 on the back side of panel 103A that fall inside the marked area can be avoided, if possible. The access passages 104 should preferably be placed in areas which weaken the resulting panel 103 the least, which is typically those locations free of structural reinforcement members such as the ribs 105 (as shown in FIG. 11). When new panels 103 with passages 104 incorporated therein are used to replace existing panels 103A (rather than forming passages 104 through existing panels 103A), the reinforcing structure of the new panels 103 can be designed to accommodate the passages.

Selecting which panel(s) 103 (hereafter referred to with the number 103, regardless of their state of modification) require modification or redesign is an important consideration in this new mounting method. To identify the target panel(s) 103 which require modification (or replacement), a logical determination based on a number of factors must be made. One obvious factor is the proximity to the mounting location. If the mounting location is directly over the center of a floor panel 103, that floor panel 103 would be considered a target panel for modification and the best location to place an LTS 200 underneath. However, if the mounting location is on an edge of a panel 103, or straddling adjacent panels, then the two straddling panels would be the logical target panels to be modified and two LTS units 200 would typically be employed; one under each panel 103 (as is the case for the example shown in FIGS. 7-8). In addition, an above-floor bracket 125, spanning the two LTS 200 below, may be desirable to use in this circumstance. There are instances where up to four panels 103 might be targets; if for example, the mounting location was located at the intersection of these four panels.

As an additional consideration, based on the anticipated loads generated by the item, additional nearby panels 103 might be targeted, or additional LTS units 200 installed and interconnected under the floor, but no access passages 104 provided on the neighboring panel 103 (i.e., the unmodified floor panel 103 overlies an LTS 200 which is connected to and provides additional load transfer for the LTS 200 to which the item is mounted). The possible configurations are subject to the expected loads generated by the item (based on its size, mass, and the distribution of mass), the available aircraft structure, the under-floor obstructions, and desired mounting location.

In addition, the cut outs 104 of the floor panels 103 must have sufficient clearance in X and Y so that when the item, or item with mounting bracket, and the LTS shift during crash or normal operations, the item or item with mounting bracket to the LTS below does not impact the floor panel 104 cutout side wall. Instead, the LTS should strike some other surface under the floor, thereby transferring the load to that surface and not the side wall of the panel cut out 104. Ideally the cut out design and the LTS freedom of motion in X and Y must be designed to allow for under floor transfer to occur first, but eventually when enough load is transferred, contact with the cut out wall 104 can eventually occur, further aiding in load transfer. This is detailed in a section below.

Figure 5:
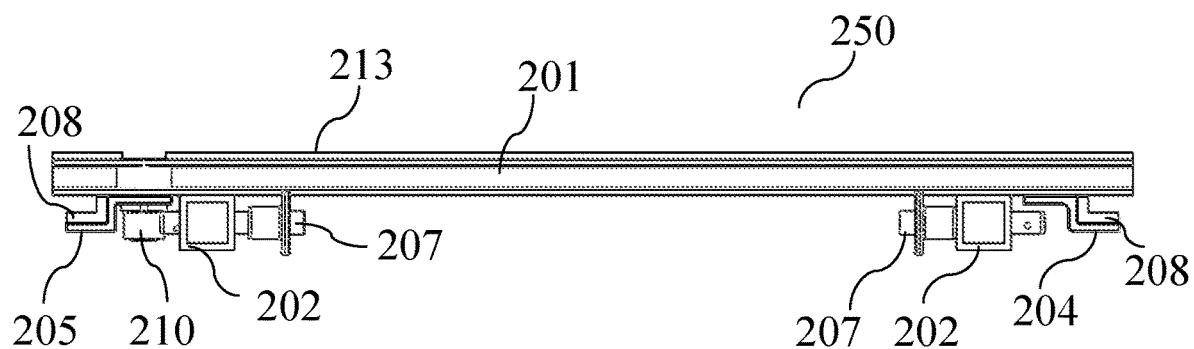
Figure 6:
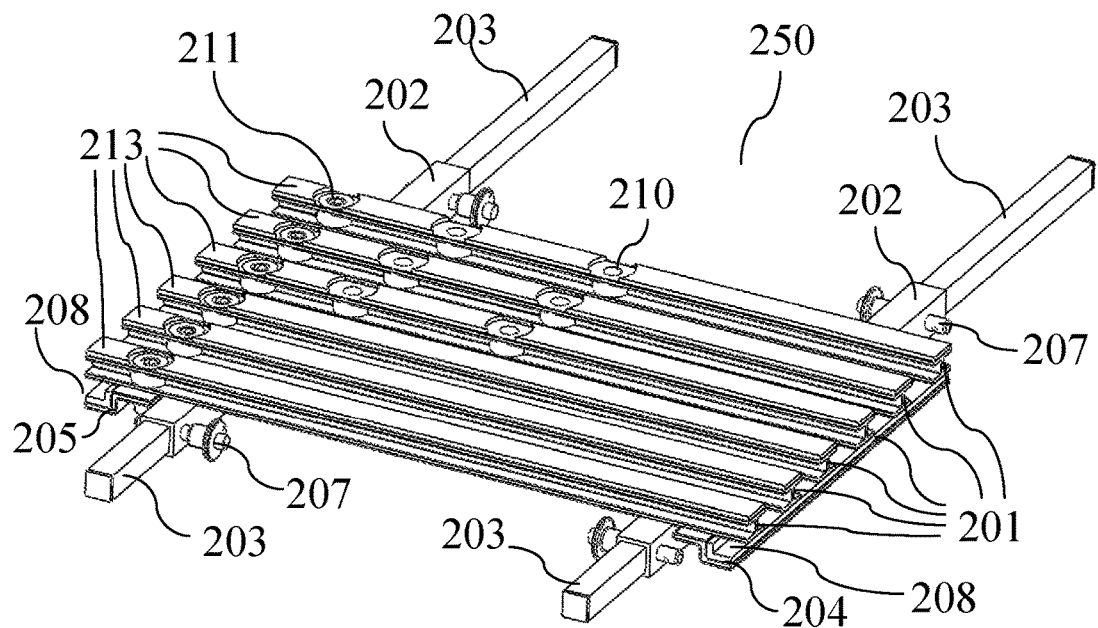
FIG. 6 is an oblique view, which also illustrates mounting pads 210 that form part of mounting members, as well as cross members 202 that fix the position of the mounting members and act to transfer loads to the aircraft structure. Outriggers 203 are also shown, which are pinned into position using quick release pins 207.

An exemplary LTS 200 is shown in FIG. 4, while a shorter LTS 201 is shown in FIGS. 5 and 6, with FIG. 4 and FIG. 6 being oblique views, and FIG. 5 a side view. The LTS (200, 250) have a series of mounting members 201, connected together and fixed in position with respect to each other by cross members 202 and fixed gripper members 204, the cross members 202 in turn housing extendible outriggers 203. Removable gripper members 205 and 206 of FIG. 4 also attach to the mounting members 201 with fasteners. In use, the mounting members 201 extend along the X direction (parallel to the stringers 101), while the cross members 202 and gripper members (204, 205, & 206) extend along the Y direction (parallel to the formers 104); however, in some aircraft it may be practical to employ LTSs formed by members that are inclined rather than perpendicular.

As shown in FIG. 6, the mounting members 201 collectively have an array of mounting pads 210. Where the mounting members 201 are provided by I-beams, the mounting pads 210 can be provided by adding extra material affixed to the I-beams, with passages extending therethrough. The passages could be designed to securely engage fasteners (such as be being threaded when threaded bolts are employed to secure the item), or could be plain passages that allow fasteners to pass therethrough to attach to elements (such as nuts or nutplates residing below the mounting pads 210.

Where the cross members 202 are formed by square tubes, as illustrated, the outriggers 203 can be provided by smaller-size square stock that telescopes within the cross members 202; when extended, quick release pins 207 can be employed to lock the outriggers 203 in their extended position. Where more than one LTS 200 is employed, one or more outriggers 203 of one LTS may extend into the cross member(s) of the other and be pinned in place to secure the two LTSs 200 together (as shown in FIGS. 7 and 10-13).

Figure 8:
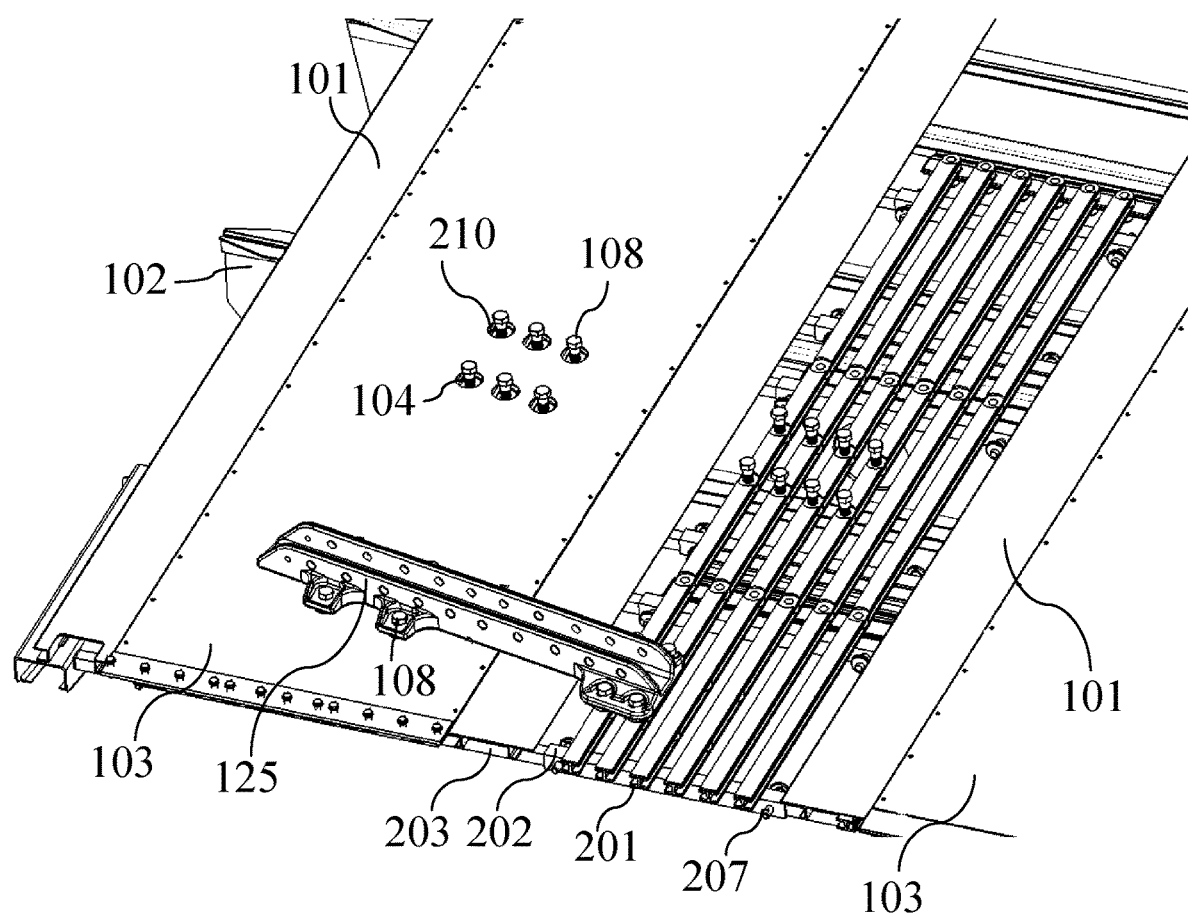
FIG. 8 shows the same situation as shown in FIG. 7, but where one of the floor panels has been re-installed over the installed LTS which rests atop the formers of the airframe. A mounting bracket 125 has been installed, fastened to the LTS located under the panel.
Figure 15:
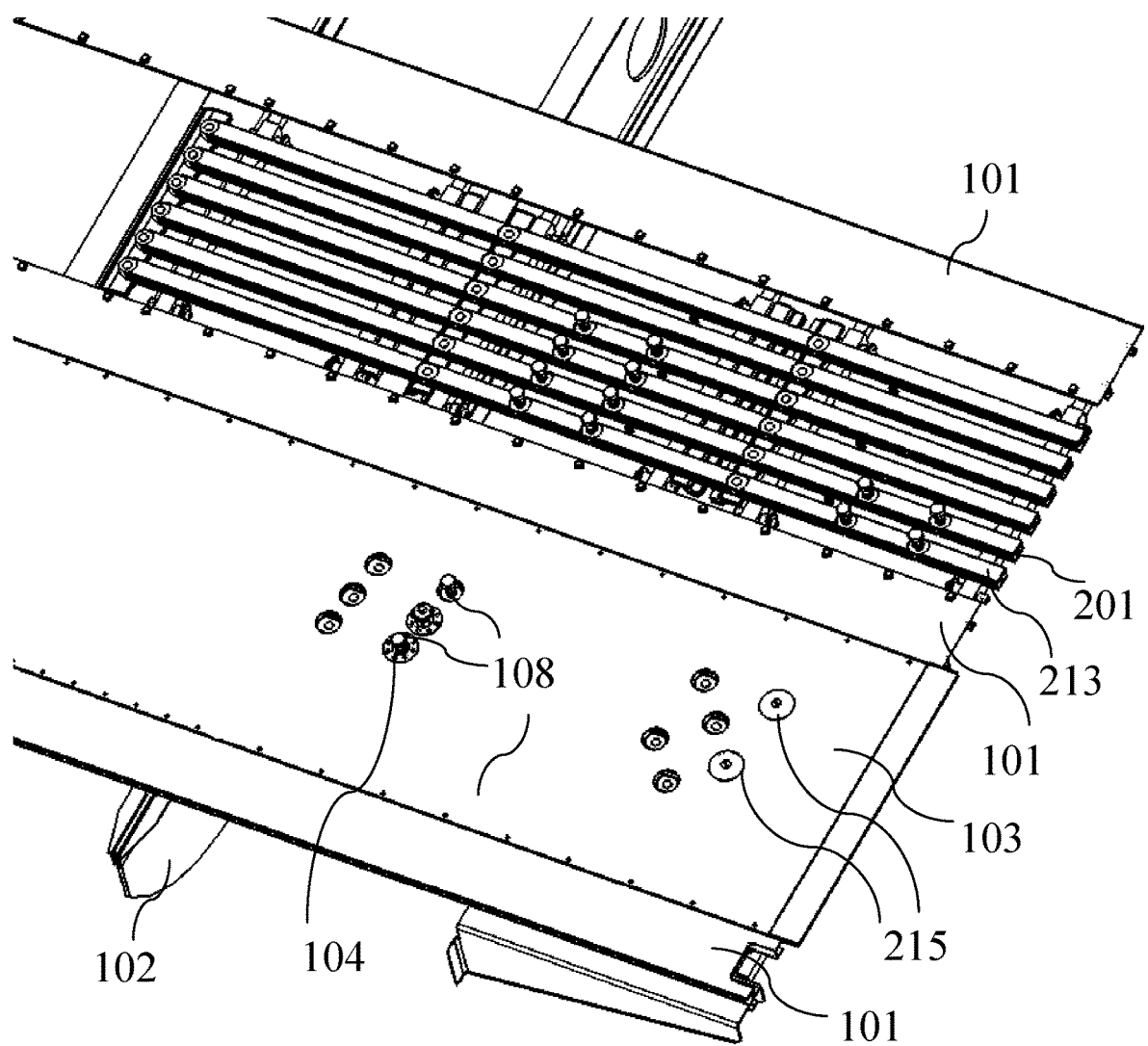
FIG. 15 is an oblique view looking from the top down with the two LTS units 200 (such as shown in FIG. 4) installed, and one modified floor panel 103 reinstalled.

FIG. 7 illustrates a pair of LTSs 200 installed into an airframe 100 after two floor panels 103 have been removed. Before the modified floor panel(s) can be reinstalled, the LTSs 200 are installed. Once the LTSs 200 are installed, the modified floor panels 103 are replaced. FIG. 8 depicts the replacement of one of the two modified panels 103, and illustrates an optional interface bracket 125 mounted above the floor. This particular bracket 125 can be used to further mount a seat; however, the seat or item could be mounted directly to the underlying LTS, if the seat leg or the item's design, offered a compatible interface to the LTS. When both panels 103 have been installed, the bracket 125 can be fastened to the LTSs 200 located under the panels 103, such as by bolts 108 (shown in FIG. 15). It should be noted that panel(s) 103 can be removed and modified to provide access passages 104 or replaced with new panels provided with access passages. Once the LTS(s) 200 are installed, the modified or new floor panel(s) 103 can be replaced, and the item mounted above the floor to the LTS(s) 200 (either directly or via a bracket such as the bracket 125), the basic method of the invention has been performed. It should be noted that the LTS 200 could be provided with multiple arrays of mounting pads 210, and the floor panel 103 could be provided with corresponding multiple arrangements of access passages 104, to accommodate mounting items (or brackets 125 to which to items can be selectively secured) at different positions. In such cases, such as shown in FIG. 15, any access passages not currently in use should be closed with caps 215.

Figure 9:
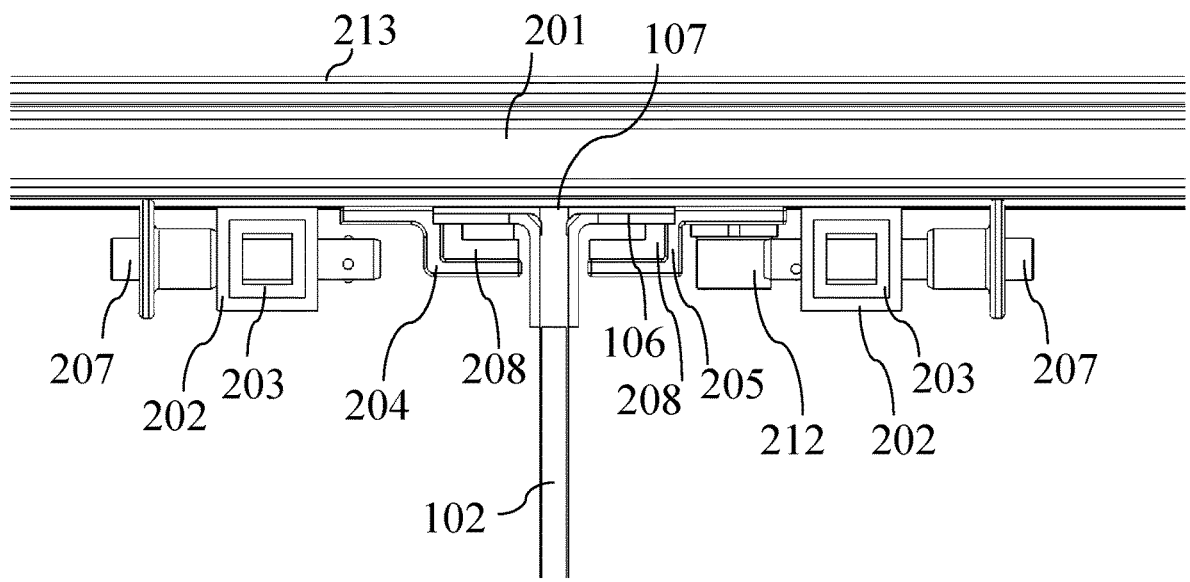
FIG. 9 is a side cross sectional view of a portion of the airframe and installed LTS shown in FIG. 7, showing how one of the LTS clamps onto a former lip 106 utilizing clamping members 204 and 205 attached to the mounting members 201 of the LTS.

FIG. 9 shows some details of the engagement of the LTS 200 with one of the formers 102 of the airframe 100. The mounting members 201 rest atop the formers 102, resting on a former lip 106, thus limiting motion of the LTS 200 in the negative Z (downward) direction. It is desirable to add some wear tape between the former lip 106 and the bottom of the mounting members 201 to preserve the former lip surface 107 over time.

Figure 14:
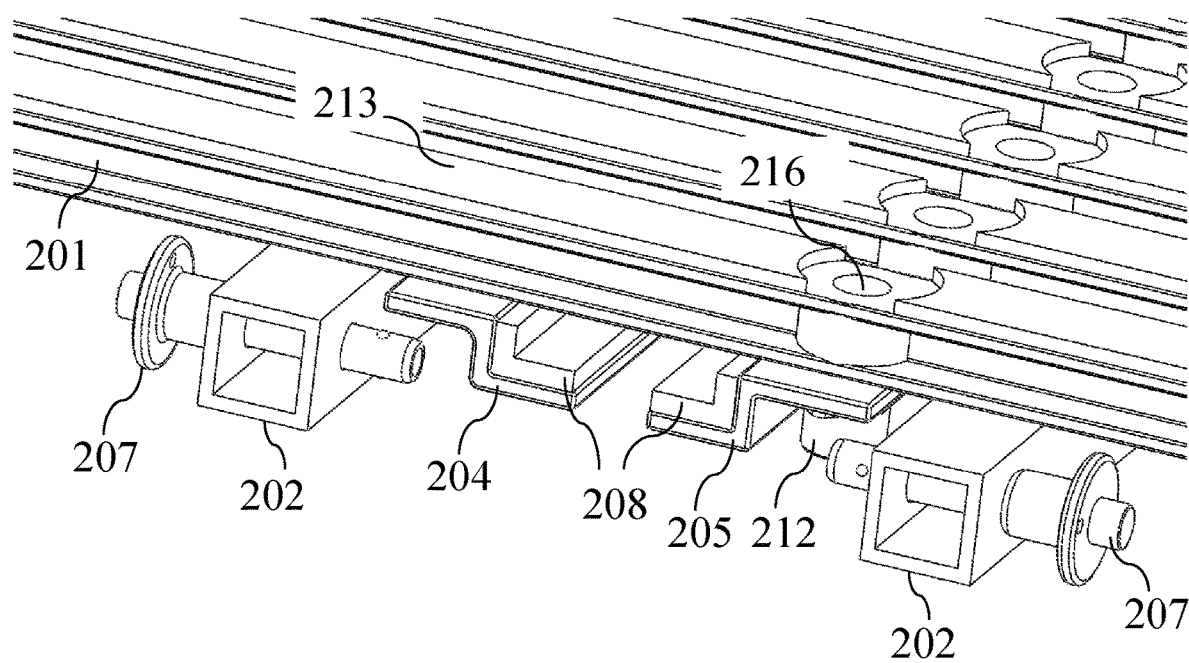
FIG. 14 is an oblique view of a portion of the structure shown in FIG. 9 with the former 102 and associated upper lip 106 removed. Bolt holes 216 are used to secure gripper member 205 into final position once the LTS is positioned over the formers 102.

To limit the motion in the Z+ direction the LTS 200 can be designed to clamp onto the former lip 106 of the former 102 by use of the gripper members 204 & 205 (gripper member 206, shown in FIG. 4, engages another former lip 106 in a similar manner to the gripper member 205), attached to the mounting members 201. These gripper members 204 and 205 are also shown in FIG. 14, with the former 102 left out for clarity. It is important to note that the gripper member 204 is fixed to the mounting members 201, but that the gripper member 205 (and 206) is detachable from the mounting members 201. This allows the LTS 200 to be installed and removed while still providing eventual engagement to both edges of the flanges (aft and forward) of the former lip 106. There is also an air gap that is designed onto the LTS 200 between the gripper members 204 and 205 and the former lip 106. The air gap is designed into the LTS to allow for aircraft flexing during normal flight operation without the resilient material 208, found on gripper member 204 and 205, from engaging the lip and loading it unnecessary.

Figure 12:
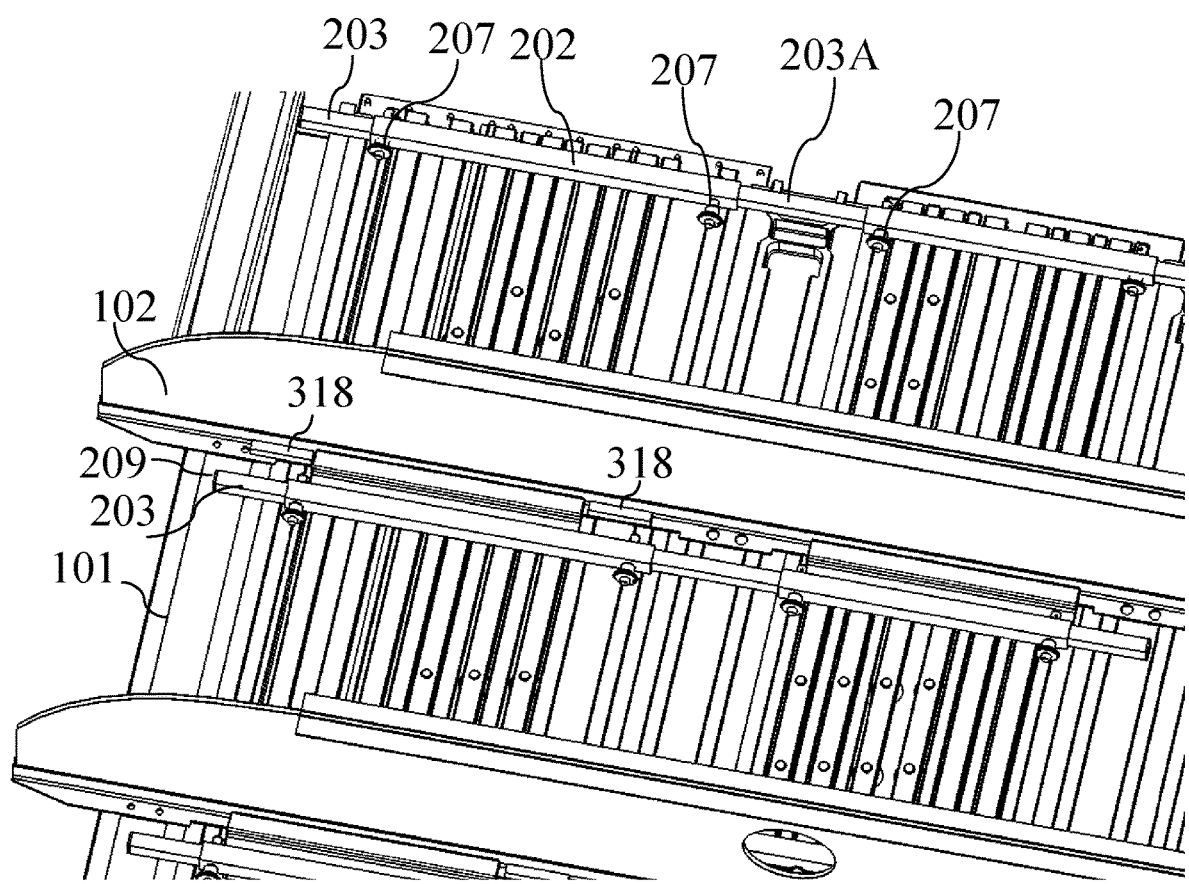
FIG. 12 is a view of the mounting system shown in FIGS. 7-11 from the bottom of the aircraft looking up. Both LTS units and the associated modified floor panels have been installed.
Figure 13:
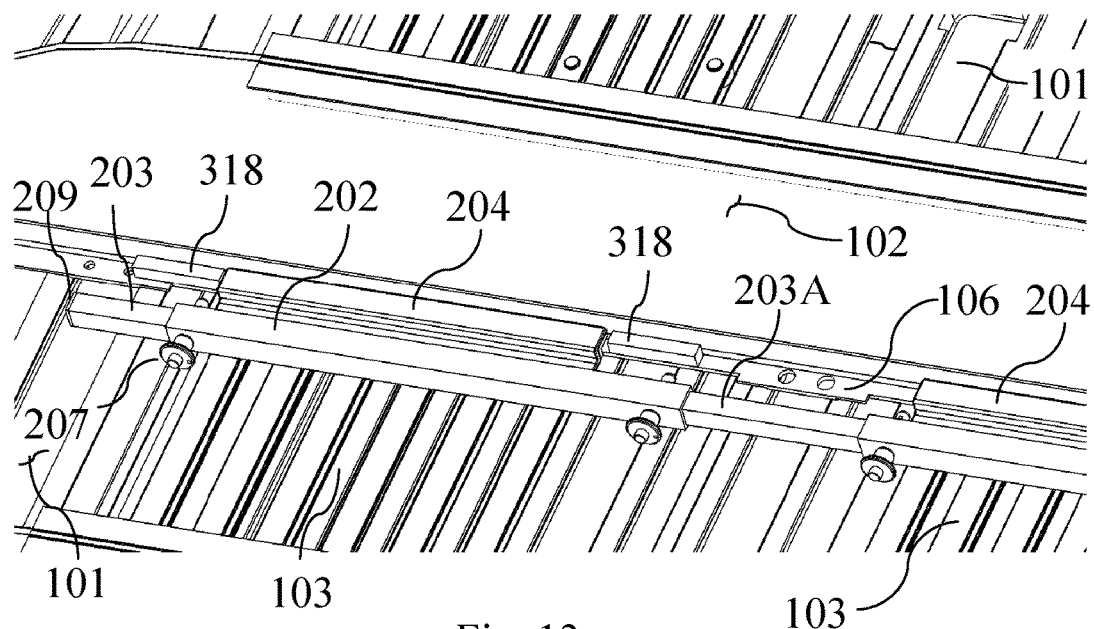
FIG. 13 is a close up view of a portion of FIG. 12.

FIG. 10-13 show how the two LTSs 200 can be extended and linked together by extending outrigger members 203 that telescope from the cross members 202. The outrigger 203 on the left in FIG. 11 is extended and secured in its extended position by quick-release pin 207, where it provides displacement limitation in the −Y direction against existing aircraft structure 211 (such as a gusset). FIG. 11 shows the caps 209 on the end of the outriggers 203 in contact with the gusset 211 at locations 214. The outrigger 203A on the right in the illustration is coupled to the neighboring LTS unit 200, extending into one of the cross members 202. This connection is also shown in FIGS. 12 and 13, and it can be seen that the extended outriggers 203 underlie some of the stringers 101 of the airframe, thus serving to further limit motion of the LTSs in the +Z (upward) direction.

Limitation of lateral (Y− direction) movement can be enhanced by adding bump stops 318 onto the formers 102 or the former lips 106, positioned to bracket one of the fixed gripper members 204, as shown in FIG. 13.

Figure 16:
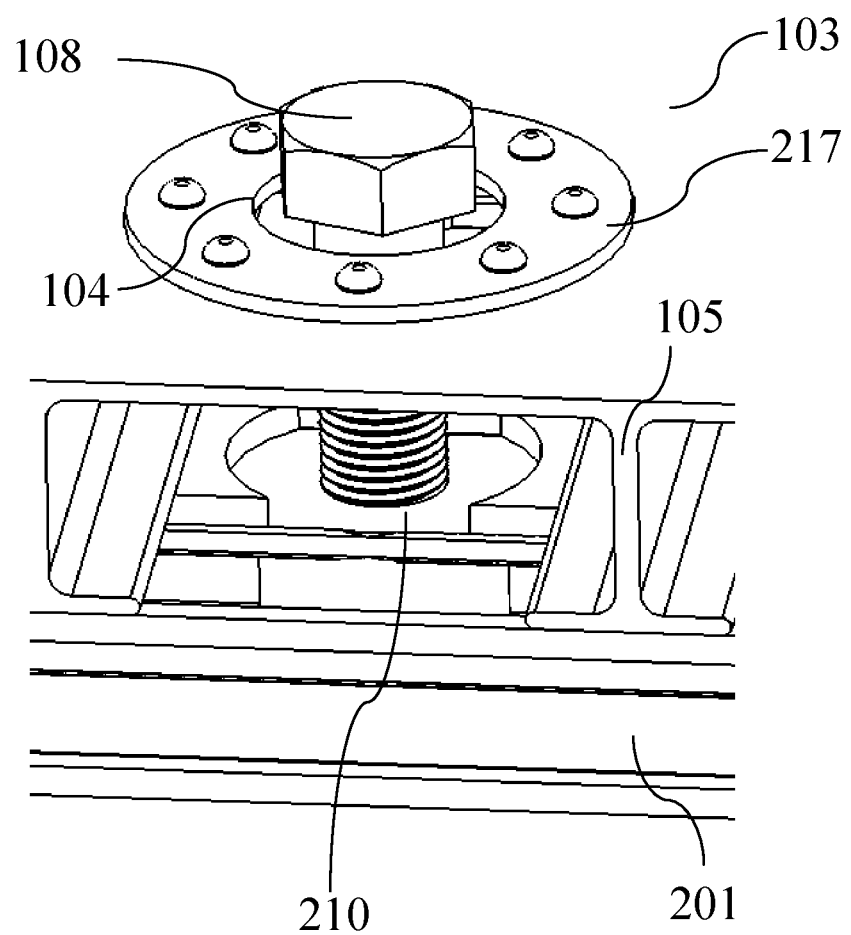
FIG. 16 illustrates a portion of an alternative LTS. In this embodiment, LTS mounting members are located farther below the upper surface of the floor panel, which results in decreased load transfer.
Figure 17:
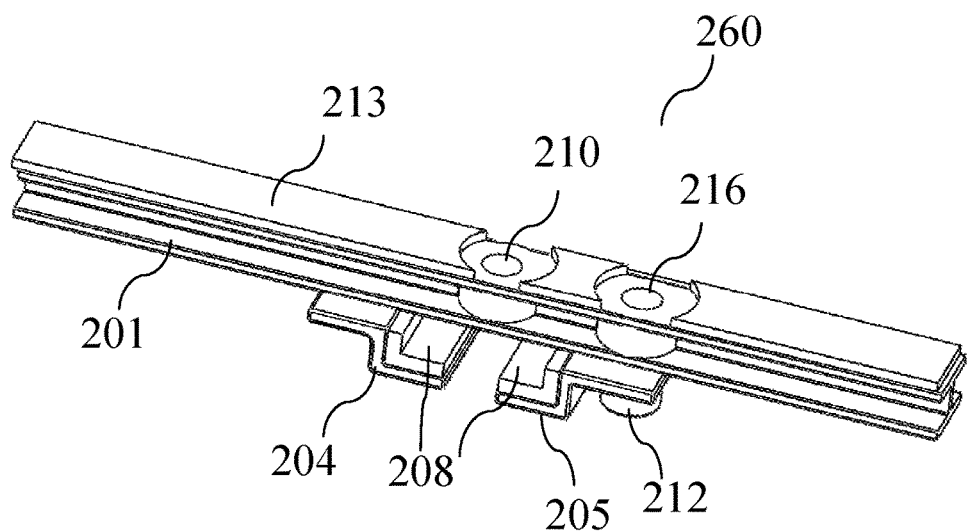
FIG. 17 illustrates basic elements of an LTS unit.

While the LTSs 200 and 250 offer specific examples, alternative LTS structures are possible (such as shown in FIGS. 16 and 17), and may be more suitable for use with different aircraft designs and/or different items to be secured. Common features of an effective LTS are:

1) Mounting Point(s):

All LTS designs must provide at least one mounting point, such as the mounting pad 210 as seen in FIG. 17 or FIG. 4, that provides an anchoring structure under the floor to which an item can be secured (either directly or via an intermediate bracket, such as the bracket 125). The number, pattern, and type (hole, threaded hole, hook, etc.) of mounting points are dependent on the maximum anticipated loads that the item will generate while mounted in the aircraft. The location of these mounting point(s) must be in sufficient alignment with the access passages 104 in the floor panel 103, to allow for the item(s) to be attached to the LTS via the access panels, once the LTS is mounted below the floor panel and the floor panel re-installed. In addition, the size of the access passages or cut outs 104 must provide sufficient gaps as detailed further below.

2) Load Transfer:

The LTS design must act to transfer loads generated by any items secured to the mounting points to airframe structures under the floor, utilizing the LTS and its structural members to transfer the loads (as discussed below).

3) Z-Load Transfer:

Any loads in the Z−(downward) down direction generated by the item(s) must ultimately be resolved onto the formers 102 through the LTS structure. This can be accomplished by the preferred configuration of resting mounting members 201 of the LTS upon more than two of the formers lips 106, as shown in FIG. 7-9. This is only possible when the LTS is of sufficient length to span the two or more formers 102 and former lip 106. This configuration offers the best Z-load transfer.

In the event that the LTS only spans one section, between two formers (shortest effective fit), as depicted in FIG. 6 and FIG. 5, the mounting members 201 must have sufficient length to at least rest on the forward and aft former lips 106 to some degree depending on the Z− loading required. FIG. 6. depicts the shortest LTS that can engage multiple formers 102, since it can only engage the one edge of the forward and one edge of the aft former lips 106. The gap shown just above the resilient mount 208 on the left and right side of FIG. 5 is where the formers lips 106 would reside. The mounting member 201 would sit atop the formers lips 106 while the gripper members 204, and 205 would eventually limit X+, X− and Z+ loads by striking the aft and forward former lip 106 of the corresponding formers 102. (forward and aft or from the FIG. 5 perspective left and right since FIG. 5 is a side view). While a shorter LTS that grips onto a single former is possible (as shown in FIG. 17), the resistance of such an LTS to displacements is limited, particularly to displacements of the item which cause torques about the former lip 106, since the grippers engage the airframe at a very narrow separation.

Figure 18:
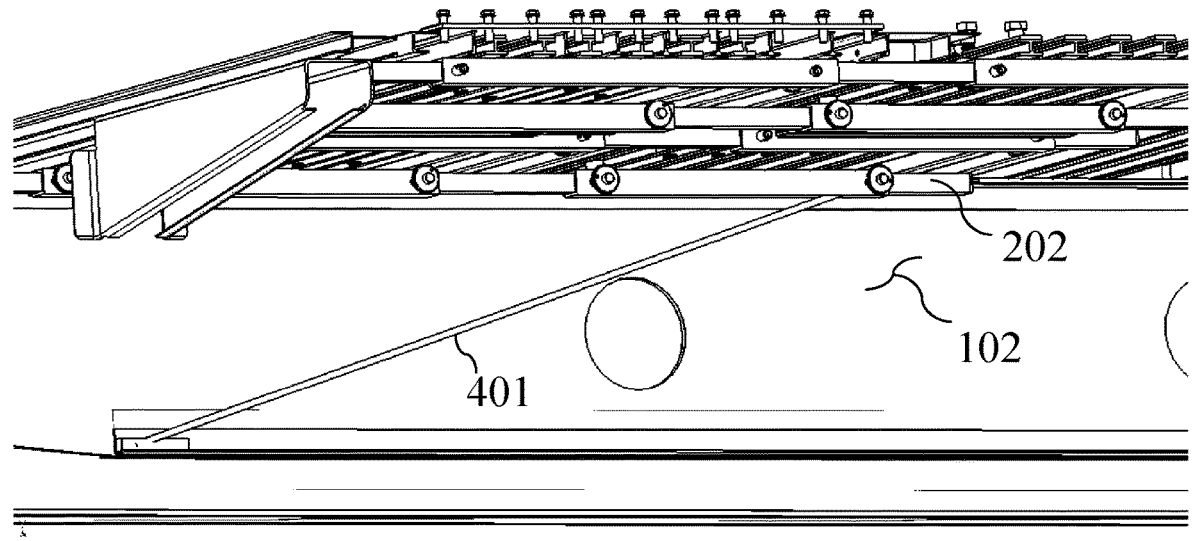
FIG. 18 illustrates an alternative embodiment where a cable attached to the airframe is employed to limit movement of an LTS to arrest forces in the y+ direction.

4) Displacement Limitations:

All LTS designs must include means by which the LTS is configured relative to the aircraft structure (either existing aircraft structure or with additional limiting hardware added) so as to limits the displacement of the LTS in X, Y, and Z directions by either direct or indirect contact with the aircraft structure. Additional aircraft structure could include any type block or material attached to existing aircraft structure to extend the reach of the aircraft structure. For example, FIG. 13 shows stop blocks 318 which can be adhered onto the former lip 106. It is preferable that the stop 318 has some resilient properties, but it is not mandatory. An alternative form of additional displacement limiter is a cable, such as cable 401 shown in FIG. 18 which attaches between the LTS and the aircraft structure, or which attaches between members of the aircraft structure; in the case shown in FIG. 18, the cable 401 connects between a cross member 202 of the LTS and a former 102 of the airframe 100, and preferably has some slack to accommodate flexing of the airframe 100 during normal flight.

5) LTS Load Transfer Limitations:

The LTS, used in combination with any additional structure, must not transfer loads to the aircraft structure when the aircraft is operating within its certified flight specification envelope which could result in structural fatigue or structural failure. This limitation is discussed in greater detail below.

With regard to the ability of the LTS to transfer loads, this ability relies upon the design of the LTS and how the LTS members attach to or contact the existing structure under the floor. There are some defining principles of LTS design which are:

1) Loads in the Z–(downward) direction should be resolved to the formers 102. This can be accomplished when the mounting members 201 sit on top of the former lip 106 as shown in FIGS. 7-9. In FIG. 9, contact surface 107 shows the contact between the mounting member 201 and the former lip 106. Typically, a wear strip or wear tape is placed at 107 to protect the former lip 106. This configuration is typically preferred, because the former 102 and its upper lip 106 are designed to handle large downward loads and are structurally unaffected by routine repetitive loads generated during normal operation of the aircraft. –Z loading of the former 102 can also be accomplished by clamping to, adhering to, or bolting (not generally recommended, as it might require modification to the former 102 which may raise structural concerns) the LTS to the upper lip 106 of the former or to other surfaces of the former 104. The goal is to transfer –Z loads generated by the item(s) secured to the LTS to one or more of the formers 102 directly or indirectly.

2) Excluding Z-loads generated by the item(s), loads caused by atypical movement of the aircraft (such as in a crash) must be resolved by transferring the loads into the former (primarily) and other under floor aircraft structure. Proper design of a LTS should not result in transferring loads which cause displacement of the existing aircraft structure when the aircraft is operating within the confines of its design specifications. Thus, it is typical to provide gaps and or resilient interfaces between the LTS and added or existing aircraft structures found under the floor. Loads generated during normal flight operations are channeled into aircraft structures which the original aircraft designers anticipate and have designed the structures to withstand these loads. However, if the LTS were to interfere with these expected aircraft structural displacements or load transfers (such as by stiffening a region of the structure that is designed to flex), it may result in excessive loading or fatigue to the existing aircraft structure, which is not desirable. By designing the LTS with gaps between its load transfer members and any aircraft structure, the issue of unintended transfer of loads or the hindrance of expected structural displacements is eliminated or greatly reduced. Obviously, gaps can also be calibrated by the addition of various thickness is of materials preferably resilient materials so that when during an extraordinary event the LTS structures to contact existing or added aircraft structure, the contact points occur in a desirable manner. For example, it would be undesirable to have all loads being transferred by a single member of the LTS during an extraordinary event such as a crash. It is more preferable to have as many load transfer members participating in the distribution of load and, therefore, the gaps can be calibrated in such a manner to make this outcome more likely.

3) Loads in the X, Y and Z+(upward) directions generated by the item during flight must be transferred to existing aircraft structure and/or to structure that is possibly added to the existing aircraft structure.

4) The preferred embodiment of a good LTS design would be to provide resilient material at the point of engagement between the LTS and the airframe structure. This will reduce point loading and make the load transfer process during contact more effective.

5) The material composition of the LTS members is a function of the weight, loads, fabrication facilities, cost, material type, and other engineering factors. The preferred embodiment would be to manufacture the various LTS members utilizing metals such as titanium, aluminum, or composite materials such as carbon fiber. This will allow for welding and adhesives to bind the members in place and reduce the need for additional fastening hardware. However, based on the loads generated by the item, even fire-resistant wood can be utilized; selection of an appropriate material for a certain expected load can be determined based engineering and production factors to suit a particular situation.

6) The number of mounting members, the number of mounting points, the number of cross members, and the amount of contact surface the LTS members provide in various orientations is also a function of engineering principles and calculations. For light loads, fewer of these numbers are required, but a small contact surface is required, but for larger loads it is preferable to have very long and numerous members to distribute the loads over a vast area of structure. In addition to overall weight, the mass distribution of the item must be taken into account, as a higher center of mass has a longer moment arm to generate torques that the floor level where forces are transferred through the LTS to the airframe. Thus, a low item typically requires an LTS with less load transfer capability than a taller item of the same mass.

In considering the load transfer characteristics of the LTS, it should be noted that the LTS experiences two modes of operation. For the majority of its utilization, the aircraft which is utilizing at least one LTS will be operating within its designed parameters. This means that the item(s) secured to the LTS(s) will experience accelerations which are relatively low, resulting in negligible load transfers to the LTS. In fact, the majority of the loading will be the Z(downward) loads due to gravity. These loads will obviously be increased during takeoff and landing, but during level flight and while on the ground, the LTS will mainly experience loads due to gravity generated by the item(s) and the LTS's own mass. The airframe formers can easily support these loads by design. However, if the aircraft experiences negative G forces or accelerations in the X or Y directions that would result in loads sufficient enough to overcome the friction of the LTS sitting on top of the former, the LTS could move. At this point, the LTS load members would eventually come into contact with aircraft structure, arresting but terminating the movement in the particular direction. This is another reason why contact surfaces are preferably resilient, to reduce the sudden deceleration felt by the item(s) secured to the LTS(s) when the motion of the LTS(s) is limited by contact with the aircraft structure. Proper LTS design should provide load transfer members which can withstand repetitive loads that are generated by the item(s) during operation of the aircraft within its maximum specification envelope. Typically, however, the robustness of the LTS design is required to secure the item(s) in place even under crash loads, which far exceed the design specifications required to withstand these low-level repetitive loads. These low-level loads may or may not even be sufficient to displace the mass of the item and LTS, but high loads will overcome friction, or if the loads are sufficient to overcome gravity, then the LTS and item as one unit will begin to move and accelerate. As the LTS begins to displace, its members contact the various structures that the LTS has been designed to strike to limit motion, and the process of load transfer will begin. The LTS designer must determine or estimate which structures on that particular aircraft, in that particular location, are within reach of the mounting point(s) on the LTS and how the various members of the LTS will interact with these structures.

Figure 20:
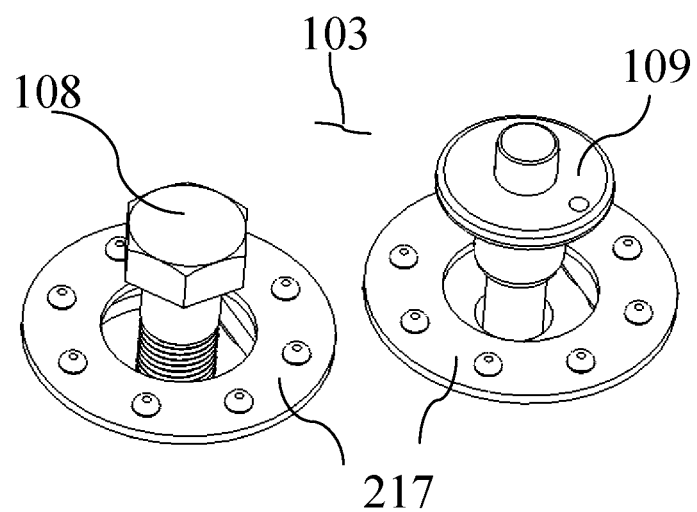
FIG. 20 illustrates the use of an alternative fastening method beside a bolt that can be used to mount an item (or bracket) to the LTS.

The design of an LTS unit (such as LTSs 200 and 250 shown in FIG. 4-15) may begin by identifying the location of the access passages 104, based on the desired location(s) of the item(s) to be secured into the aircraft and the fastening points on the item(s) or one or more brackets to which the item(s) can be secured. The access passages 104 define the mounting points where the item is to be fastened to the LTS, and the LTS design in turn must provide mounting structures (such as mounting pads 210 shown in FIGS. 4, 6, 8, and 14) positioned to mate up with the fastening points on the item(s) to be mounted through the access passages 104. The mounting structure 210 can take the form of a pad or insert of material with a hole, allowing the item(s) and the LTS to be fastened together by bolts and nuts; if the mounting points on the LTS are provided worth threaded passages, bolts could be secured directly into such threaded passages to secure the items to the LTS. Alternative fastening techniques known in the art could be employed. There are additional mounting methods which the design can facilitate based on the transfer loads, and speed of installation, or the use of tools. For example, FIG. 20 depicts a quick release pin 109 used in conjunction with a bolt 108 to secure the item in position.

With the mounting location(s) identified, the LTS must provide a means by which the item(s) can align with the mounting pads 210 located on the LTS structure to be secured to the LTS through the use of such mounting pads FIG. 17. The member(s) of the LTS that contain the mounting pads are called mounting members 201 and every LTS must have at least one mounting pad. It is desirable that the distance required to the reach the LTS mounting point(s) is minimized as much as possible, since shorter attachment hardware can transfer more load without failing. Since the item(s) by definition reside above the surface of the floor panel(s), the closer the LTS mounting members are to the upper surface of the floor panel the better. Therefore, it is preferred to have the mounting members 201, that contain the mounting pads 210, reside as close as possible to the top surface of the panel 103. This can be achieved when the mounting members 201 are between floor panel 103 reinforcing ribs 105, as shown in FIGS. 10 & 11. While the mounting pads 201 should be close to the upper surface of the floor panel 103, it should be noted that the mounting members 201 should be slightly shorter than the ribs 105, to allow for slight flexing so as to avoid inadvertently applying loads to the floor panel 103 during normal flight. As noted above, the relative heights of the mounting members 201 and the ribs 105 can be selected to provide a calibrated gap such that, in the event of a crash, the upper surface of the mounting members 201 contacts the underside of the floor panel 103 at the same time as other elements of the LTS 200 contact other elements to limit the displacement of the LTS 200. As also noted earlier, the Mounting members 201 may have a resilient material 213 on their top surfaces.

FIG. 16 shows an alternative design where the mounting members 201 are under the floor panel ribs 105 not between them. Although this design can function and achieve the stated mounting goals, it is not preferred in most cases because of the long reach of the bolt 108, which results in a decreased load transfer from the item to the LTS.

Once the LTS mounting members 201 in FIG. 6-15 have been positioned to match the access passages 104 and, if necessary, fit between the reinforcing ribs 105, additional members must be added (such as cross members 203, 204, 205, 206) to the LTS structure to secure the mounting members 201 in place relative to each other so that their relative positions (the pattern of the mounting pads) do not shift. Any shift of these members in the XY plane would result in one or more mounting pads 210 being out of alignment, thereby making it difficult or impossible to pass the mounting hardware through the access passage 104 to secure the item(s) to the LTS.

The LTS will typically be called upon only once to carry very high level loads that the item(s) may generate during a crash condition. Such a high-G crash will likely result in the loss of the aircraft, therefore, the LTS must transfer loads to as much structure of the aircraft as is practically feasible in order to absorb these very high crash loads; unlike load transfer during normal flight operations, overloading any particular aircraft structural component under these conditions is not of concern. The concern here is to maintain the item(s) secured so as to avoid injury to crew resulting from dislodged items. Some of the expected aircraft structure may become unavailable or damaged during a crash, so it is important to have multiple points of contact with various available under floor structures.

For the LTS to perform its stated function of transferring loads generated by the item(s) during routine and extraordinary conditions, paths for the loads to transfer to the under floor structure must be provided. The starting point for an effective load transfer begins with the mounting of the item(s) to the mounting members of the LTS (such as the mounting members 201), which are designed to couple with the item(s) via the access passages 104 of the floor panels 103, as described above. It is typically preferred to have a gap and resilient material 213 between the mounting members 201 and the floor panel 103 to allow for proper gap calibration, so that additional members such as the cross members can engage before or simultaneously with the mounting members to prevent overload of the floor panel during impact. The mounting members could be formed as I-beams, square tubes, channels, plates, or similar structural shapes.

To maintain the mounting members 201 in relative position, cross members (such as 203, 204, and 205/206) can be employed to span across the mounting members 201 and affix them with respect to each other. For example, referring to FIG. 6, two cross members 202 can be seen spanning several mounting members 201. Depending on the material properties of members 202 and 201, various methods can be used to lock their relative positions. For example, if members 202 and 201 are composed of the proper metallic alloy, welding them together would be a simple and effective method of locking their relative positions. If the members were made of a composite material, an adhesive might be the preferred attachment method. In addition to welding and bonding, cross members can be bolted or riveted into position.

The cross members can take the form of plates, I-beams, tubing, any shape or size, as long as the members which contain the mounting pads for the LTS are locked into a relative position by the cross members. It is generally preferred for the cross members to perform additional functions rather than just being utilized to maintain the relative positions of mounting members, and in the LTS 200, the cross members 201 FIG. 4 can also serve as part of the structure to limit the motion of the LTS 200 relative to the formers 102. In the LTSs 200, the cross members 202 house the outriggers 203 that can be extended to further limit the motion as well as to link together adjacent LTSs residing under adjacent floor panels 103. The cross members 202 are supplemented in affixing the mounting members 201 in position by fixed gripper members 204, which are Z-shaped members that can be affixed to the mounting members by similar techniques as used to affix the cross members 202.

Referring to FIG. 9, in addition to affixed tubular cross members 203 and 203A, there are Z-shaped gripper cross members, fixed gripper member 204 and movable gripper member 205 and in some cases 206. For clarity 206 and 205 are similar in nature but 206 happens to have a slightly longer flange to reach the former lip 106 in this particular embodiment. In the LTS 200, the gripper member 204 is affixed to the mounting members 201 to help lock them in place with respect to each other, but additionally serves to engage the former lip 106 to limit motion in the X direction. The design of gripper member 204 relative to the former lip 106 includes space for a gap and a resilient pad 208 interposed between the gripper member 204 and the former lip 106; this is highly desirable, but it is not an absolute. While the gripper member 204 is fixed to the mounting members 201, movable gripper member 205 is affixed to mounting members 201 by bolts (not shown) that pass though 216 the mounting member 201 and gripper member 205 and thread into nutplate 215 (alternatively, the gripper member 205 can be provided with threaded passages, if it is made sufficiently thick to secure the bolts). In addition to providing yet another cross-support to the mounting members 201 when bolted thereto, the movable gripper member 205 mirrors the fixed gripper member 204 and is also designed to accommodate former lip 106 while providing a gap and with resilient material 208 interposed between the gripper member 205 and the former lip 106. Together, the gripper members 204 & 205 closely bracket the former lip 106 to limit movement in the X (for-and-aft) direction, and provide structure for the LTS 200 that resides closely below the lip 106 in order to limit movement in the Z+(upward) direction. Having the gripper member 205 removable allows installation of the LTS 200 by positioning the fixed gripper member 204 into place extending below the former lip 106, and then installing the movable gripper member 205 to trap the former lip 106 between the gripper members 204 & 205.

FIG. 14 shows how cross members 202 and fixed gripper member 204, all running in the Y direction, can be welded or bonded to the mounting members 201 to secure them together to retain their relative positions. Movable gripper member 205 (and 206) can also attach the mounting members 201 together, but it utilizes bolts (not shown) that pass through the mounting members 201 through holes 216 (which can be provided in pads essentially similar to the mounting pads 210 for ease of fabrication) and through holes in the gripper member 205, before threadably securing into one or more nutplates 212 (alternatively, individual nuts could be employed, or threaded passages provided in the gripper member 205 itself if sufficiently thick). While the LTS 200 shown in FIG. 14 attaches each mounting member 201 individually to the gripper member 205, only a select number of mounting members 201 could be so secured, where the attachment to other components (cross members 202 and fixed gripper members 204) is sufficient to fix them in their relative positions; this reduces the number of bolts needed to install the LTS 200 in place relative to the former lip 106. As shown in FIG. 9, the positions of the gripper members relative to the former lip 106 limits movement of the LTS in the X+, X−, and Z+ directions, while the mounting members 201 resting atop the former lip 106 limits motion in the Z-direction. The gripper members 204 & 205 (and 206) can be positioned against the former lip 106 such that the X direction has no gap, which limits the displacement of the LTS 200 in the X direction just enough to compress the resilient material 208. If the designer found it desirable, a small gap could be designed into the gripper members 204 & 205/206, allowing for greater freedom of movement in the X direction. While the gripper member 205 shown is bolted into position for ease of installation of the gripper members 204 & 205 about the former lip 106, it should be appreciated that gripper member 205 could be fastened into position using other methods such as pins, or it could be adhered or welded; however, such permanent affixing of the gripper member 205 would make it very difficult to remove or service the LTS.

In some cases, the gripper members 204 & 205 could engage the former lip 106 closely enough to provide sufficient restraint to limit motion of the LTS, such as in the minimal LTS 260 shown in FIG. 17. LTS 260 has a mounting member 201 with a mounting pad 210, to which is affixed a fixed gripping member 204. A movable gripping member 205 is attached to the mounting member 206 by a bolt (not shown) passing through a bolt passage 216, through the movable gripping member 205, and threading into a nut 212. In the LTS 260, there is only one mounting member 201, so the gripper members 204 and 205 perform only a displacement limiting/load transfer function (by engagement with the former lip 106), and do not serve to attach mounting members together.

In another case, as shown in FIG. 6, a short LTS 250 is employed that is designed to fit between two formers 102 (not shown), with just the ends of the mounting members 201 resting atop the former lips 106. In this case, the LTS 250 is installed by positioning the fixed gripper member 204 under the former lip 106 of one former, and the movable gripper member 205 is then installed under the former lip of the adjacent former lip 106, so that the gripper members 204 & 205 engage opposed former lips 106, rather than bracketing a single former lip 106.

Referring back to FIG. 10-14, further limitation of motion in the Z+ direction, and in some cases limitation of motion in the Y direction, is provided by outriggers 203, which can be extended telescopically from the cross members 202 and secured in their extended positions by pins 207. These outrigger members 203A slide under the stringers 101 of the airframe to allow for Z+ retention of the LTS. FIG. 10-14 show the outrigger members 203 extending under string 101. In the particular configuration of the LTS 200 shown, the cross member 202 houses two outrigger members 203 and 203A, one extending to the Y+ direction and the other to the Y− direction. A resilient pad can be attached to the bottom face of the stringer 101 to allow the outrigger member 203 to better transfer loads thereto; by selecting the thickness of the resilient pad carefully, the gap the outrigger member 203 must transverse before applying a load can be adjusted.

It should be noted that in FIG. 10-13, the outrigger 203 that is deployed in the Y+ direction (to the right in the FIG.) is attached to a neighboring LTS 200, telescopically inserting into another cross member 202 and being locked into position with a quick release pin 207. This arrangement provides for further load transfers, over larger area, at a greater distance, allowing for the dissipation of larger loads into aircraft structure. Referring to FIG. 11, the outrigger member 203 extending in the Y− direction (to the left in the FIG.) is designed to butt up against a typical structural member 211 of the airframe 100 to aid in limiting motion in the Y-direction. The point of contact on the structural member 211 is depicted as 214 in FIG. 11, and the outrigger 203 is sized to provide a gap with a resilient cap 209 mounted to the end of the outrigger number 203. The engagement of the outrigger 203 with the structural member 211 serves to limit LTS 200 displacement in the Y− direction. If there are additional LTS units 200 and similar structures 211 on the opposite side of the aircraft, and these LTS units 200 are all interconnected, the entire system of LTSs will be limited from displacement in the Y+ direction as well, utilizing the structures on the opposite side of the aircraft. However, even without such interconnection (or the presence of structures such as the structural member 211, Y− direction motion of the LTS(s) 200 can be limited by other means, such as by engagement of the mounting members 201 with either reinforcing ribs 105 of the floor panels 103 and/or the blocks 318 (shown in FIGS. 12 & 13) positioned to block lateral movement of the fixed gripper member 204; the stop blocks 318 can be adhered into position on the former lip 106. Contact of the fixed gripper member 204 with the stop blocks 318 serves to transfer loads caused by Y direction motion into the formers 102 through the former lip 106. Such stop blocks or other additional structure to limit Y− direction motion may be particularly useful for small LTSs, such as the minimal LTS unit 260 shown in FIG. 17.

It should be noted that the cross members 202, telescoping outriggers 203, and pins 207 are only one example of structure for extending the cross members and linking adjacent LTSs together, and alternative structures for achieving the same result should be apparent to one skilled in the art. These cross members could be mounted at different angles, have different shapes, and/or may not be extendible or secured by pins. For example, such extending members could be screwed or even welded in place, and if welded or bonded together, the LTSs could have been installed by removing the stringers 101, installing the LTS, and reinstalling the stringers to accommodate permanent interconnection between LTS units.

A good LTS design will utilize the former structure of the airframe as much as possible. The formers are designed to carry significant loads and should not be adversely affected by repetitive loads in the Z direction. For this reason, it is generally preferred to have the LTS include structural elements (such as the mounting members 201 illustrated) that rest on top of the former lip 106. This configuration allows the item(s) secured to the LTS to impart gravitational loads and any Z-direction loads into the formers 102. It is also possible to design the LTS to transfer its Z-loads just on the former lips 106, as would be the case for the short LTS 201 shown in FIG. 6, but this design limits the load transfer capability of the LTS and creates a moment around the former lips 106 on either end. While the shorter LTS 201 limits the loads that can be transferred, it is perfectly feasible for securing lightweight items.

The former lip 106 can be engaged by the LTS to arrest displacements in the X+ and X− directions by bracketing both sides of the former lips 106 with gripper members 204 and 205 (as shown in FIG. 9), or by engaging opposed lips 106 of adjacent formers 102, as is done by the LTS 250 shown in FIG. 6. With the addition of bump stops 318 the former lip 106 such as shown in FIG. 13 (or to another location on the former where the block is positioned to engage the LTS), the former with such additional structure can arrest Y+ and Y− displacements, again resulting in load transfers into the former.

It should be noted that any loads transferred by the outriggers 203 to the stringers 101 are in turn transferred to the former lips 106, since the stringers 101 are attached to the top of the former lips 106 in some manner. Therefore, transfer some loads into the stringers 101 has the result of loading the formers 102.

Although the formers 102 are the preferred structure into which loads can be transferred (and such preference guides the examples used herein to illustrate the invention), they are by no means the only structure. The designer of the LTS for a particular aircraft and a particular location on the aircraft floor should take advantage any structure available to transfer loads. Loads can also be transferred through other means such as cables 401 shown in FIG. 18 with some built in slack (acting like gaps, allowing a small degree of displacement motion before imparting a load to the airframe). The LTS designer should take advantage of all load transfer methods as long the method follows the principle of not introducing undue loads into the airframe structure during normal operation, which could result in damage to the aircraft or affect its structural integrity.

As noted, the LTS, including its load transfer members and any additional installation hardware (such as additional stop blocks), must not impart loading to the aircraft structure which will either over-stress or repeatedly impart loads to aircraft structure that is not designed to handle repeatedly, as such stresses/loads could lead to structural fatigue failure. To achieve this limitation, gaps between the load transfer members and the structural members should be incorporated in every LTS design. The gaps can be calibrated by adding material such as material of various thicknesses to the contact points between the LTS and the aircraft under floor structure. The variable thicknesses allow the LTS designer to determine if the loads being transferred to the under floor structure by the LTS and its members occur simultaneously at all points or if a progression of loading based on structural factors maximum loading is desirable. It is also desirable that the contact surface material between components of the LTS and the aircraft structure be resilient, such as a form of rubber, silicon, or other deformable and/or elastic material. Contact through such resilient material helps alleviate linear or point contacting during load transfer of the LTS and its load bearing members with the aircraft under floor structure when the two come in contact.

One example of load restrictions the LTS designer must observe can be demonstrated in FIG. 15. The access passages 104 provided in the floor panel 103 have some type of material passing though the passages 104 in order to reach the upper surfaces of the mounting members 201 of the LTS 200 below. Once the LTS 200 and the item(s) to be secured thereto are in place and fastened together (in this case represented by bolts 108), there is a gap between the mounting structure of the item(s) (or bracket(s) above the floor to which the item(s) are secured, such as the bracket 125 shown in FIG. 8) and the outline of the access passage 104. If the gap between the mounting structure of the item(s) and the access passage 113 is smaller than the spacing allowed for other displacement limiters in the XY directions under the floor, then displacement may first bring the mounting structure into contact with the edge of the access passage 104, with the result that the panel 103 will take all the initial loading in the XY directions when the LTS 200 is displaced. This could lead to fatigue damage or overloading conditions leading to panel structural failure. Therefore, the designer of any LTS system should take great care to make certain that whichever aircraft structural members absorb loads imparted from the LTS, they are capable of structurally handling these loads without damage and that the expected displacement limiters of the LTS are actually going to act in the order expected and that there are no unexpected displacement limiters in play. While described in terms of the access passages 104, all spacing of the LTS relative to the aircraft structure that serves to limit motion of the LTS must be designed such that any gaps needed to allow for flexing of aircraft structure during normal aircraft operation are properly sized. This can be done by adjusting the thickness of resilient materials interposed between components of the LTS and the adjacent aircraft structure, and/or by adjusting the configuration of the pertinent members of the LTS. Failure to provide for proper spacing could inadvertently transfer loads during normal operations to aircraft structure which the OEM designers had not designed the aircraft to accommodate, leading to fatigue and/or overloading stresses which may result in aircraft damage.

Other load limitations, such as former lip maximum loading, may result in the LTS having to increase its span to allow for additional former lips to share the loads, or to increase the number members capable of transferring loads to other available aircraft structure. Additional considerations such as material composition, geometry, and the number of load transfer members all must be taken into account when designing the LTS.

In cases where the aircraft floor is sealed, the access passages 104 to the panels 103 must provide a means to reseal the floor. This can be accomplished by providing the seal on the bottom of any above-floor brackets used as interfaces to mount to the LTS. When the item to be mounted is no longer necessary and is removed from the aircraft, the access passages 104 can be fitted with sealed caps 215, such as shown in FIG. 15. Additional methods can be used to seal the floor such as rubber washers, or other silicon or other resilient material placed between the item(s) and the LTS, or around the bolts, or access passages.

The LTS 200 illustrated is designed to be readily installed and uninstalled from an aircraft, and thus adopts design features that are directed to ease of installation. Thus, details of the LTS 200 may differ from those of embodiments where ease of installation is not a priority. In particular, the use of the retractable outrigger members 203 secured by pins 207 and the use of the movable gripper members 205 secured by bolts allow the LTS 200 to be easily installed or removed from the aircraft utilizing common tools. Although LTS units can be designed to be "permanently" installed, this is generally not desirable from a service and maintenance perspective, since the LTS in most cases should be relatively easy to remove in order to allow proper maintenance of the LTS as a unit and to allow access necessary for routine maintenance of the aircraft.

While discussed in terms of preferred embodiment optimized for particular applications, variations should be apparent to one skilled in the art, and the scope of the invention should be considered as indicated in the appended claims. The dependency of the claims has been drafted to conform to the conventions of the ISA/US, and thus limited in multiple dependencies; it should be understood that all possible permutations of the limitations set forth in the individual claims are felt to be within the scope of the invention.

The invention claimed is:

1. A method for mounting an item onto an aircraft floor, the aircraft having an airframe that defines an X-axis extending along the length of the airframe, a Y-axis extending along the width of the airframe, and a Z-axis extending along the height of the airframe, the airframe having a series of weight-bearing formers and supporting an array of floor panels and stringers which comprise the aircraft floor, the method comprising the steps of:

determining the mounting location on the aircraft floor to mount at least one item;

identifying at least one target floor panel, from the array of floor panels, which is either below or in close proximity to the mounting location;

modifying the at least one target floor panel to provide at least one access passage through the floor panel(s) to the area under the floor panel(s);

installing at least one Load Transfer Structure (LTS) having at least one mounting member into the aircraft;

replacing the at least one modified target floor panel; and fastening the desired item to be mounted to said at least one mounting member of the LTS via the at least one access passage while the item resides above the aircraft floor.

2. The method of claim 1 wherein the LTS is configured to fit under the floor panel once it is modified and reinstalled, and further wherein the LTS has, at least one mounting pad for accepting a fastener to secure a portion of the item with respect thereto; and members configured relative to the airframe so as to limit displacement of the LTS in the X, Y, and Z directions with respect to the airframe, at least a subset of the members serving to transfer loads generated by the item to components of the airframe while avoiding interference with normal structural load transfers while the aircraft is operating within its design parameters.

3. The method of claim 2 wherein the at least one mounting pad of the LTS comprises an array of mounting pads provided on the mounting member(s) of the LTS so as to be in a fixed arrangement;

further wherein said step of modifying the target floor panel comprises forming an array of the access passages in positions above and matching the array of mounting pads so as to allow access thereto; and still further wherein said step of fastening the desired item to the LTS further comprises passing fasteners through the access passages so as to fixably engage the mounting pads in the LTS.

4. The method of claim 1 wherein a first LTS is installed under at least one floor panel, and a second LTS is installed under at least one different floor panel.

5. The method of claim 4 wherein said step of installing the at least one LTS further comprises linking the first and second LTS together under at least one stringer of the airframe.

6. The method of claim 1 wherein the LTS is provided with a resilient material on its surfaces which engage the airframe to constrain the movement of the LTS with respect to the airframe.

7. The method of claim 2 wherein the mounting pads of the LTS are provided on longitudinally-extending mounting members that rest atop at least one former of the airframe.

8. The method of claim 1 wherein said step of installing the at least one LTS further comprises positioning gripper members so as to limit motion of the LTS with respect to at least one former lip of the airframe.

9. The method of claim 1 wherein said step of installing the LTS further comprises extending an outrigger from at least one member of the LTS and securing the outrigger in its extended position relative to the member from which it extends.

10. The method of claim 1 wherein said step of fastening the item to the LTS further comprises the steps of: affixing a mounting bracket that resides above the floor panel(s) to the mounting pad(s) of the LTS; and affixing the item to the mounting bracket.

11. The method of claim 1 wherein said step of modifying at least one of the floor panels further comprises the step of cutting the access passage(s) into a pre-existing floor panel.

12. The method of claim 1 wherein said step of modifying at least one of the floor panels further comprises the step of replacing an existing floor panel with a new floor panel provided with the at least one access passage.

13. A mounting system for securing at least one item into an aircraft having an airframe that defines, an X-axis extending along the length of the airframe, a Y-axis extending along the width of the airframe, and a Z-axis extending along the height of the airframe,
the airframe having a series of weight-bearing formers and supporting an array of floor panels,
the mounting system comprising:
a load transfer structure (LTS) having at least one mounting pad and configured relative to the airframe so as to be constrained by the airframe in motion along each of the X, Y, and Z axes, while not imparting any forces on the airframe during normal flight operations other than those forces for which the airframe is designed;
at least one access passage formed in at least one of said floor panels and positioned to be superimposed over said at least one mounting pad, thereby allowing access to said at least one mounting pad to allow the item(s) to be secured thereto while the item resides atop the at least one floor panel.

14. The system of claim 13 wherein said at least one mounting pad is an array of mounting pads provided on said LTS so as to be in a fixed arrangement, and further wherein said at least one access passage is an array of access passages in positions above and matching the array of mounting pads so as to allow access thereto.

15. The system of claim 13 wherein said LTS is configured to rest on at least one of the formers of the airframe and reside under at least one of the floor panels.

16. The system of claim 14 further comprising:
at least one mounting bracket configured to fasten to said array of mounting pads of said LTS via said array of access passages while said at least one mounting bracket resides atop the at least one of the floor panels, said at least one mounting bracket being further configured to allow the item to be secured thereto.

17. The system of claim 13 further comprising:
a second LTS segment, which resides under at least one floor panel adjacent to said at least one floor panel under which the LTS resides; and
at least one member that links said LTS to said second LTS and extends under at least one longitudinal stringer of the airframe.

18. The system of claim 13 wherein said LTS is provided with a resilient material on its surfaces which engage the airframe to constrain the movement of said LTS with respect to the airframe.

19. The mounting system of claim 13 wherein the formers of the airframe are provided with former lips, and are connected together by longitudinal stringers, said LTS further comprising:
a series longitudinal members extending parallel to each other and resting atop the former lips, said longitudinal members extending a sufficient distance to span at least two adjacent formers;
at least two cross members, each affixed to and extending perpendicularly to said longitudinal members and spaced to fit between the formers when said longitudinal members rest on the former lips;
at least one fixed gripper member affixed to said longitudinal members and being configured with a portion insertable under one of the former lips;
at least one movable gripper member that is affixable said longitudinal members and configured with a portion insertable under one of the former lips in an orientation opposite that of one of said fixed gripper members.

20. The system of claim 19 wherein said mounting pads are provided in said series of longitudinal members.

21. The system of claim 14 wherein the system is designed to secure more than one type of item, and further comprises:
a second array of mounting pads provided on said LTS; and
a second array of access passages through said at least one of said floor panels.

* * * * *